US012046886B2

United States Patent
Hagen et al.

(10) Patent No.: US 12,046,886 B2
(45) Date of Patent: Jul. 23, 2024

(54) PUNCH SET FOR ELECTRICAL BOX

(71) Applicant: MILBANK MANUFACTURING CO., Kansas City, MO (US)

(72) Inventors: Brian Hagen, Raytown, MO (US); William E. McCarthy, Kansas City, MO (US); Christian Aragonez, Kansas City, MO (US)

(73) Assignee: MILBANK MANUFACTURING CO., Kansas City, MO (US)

( * ) Notice: Subject to any disclaimer, the term of this patent is extended or adjusted under 35 U.S.C. 154(b) by 702 days.

(21) Appl. No.: 17/065,550

(22) Filed: Oct. 8, 2020

(65) Prior Publication Data

US 2022/0115849 A1 Apr. 14, 2022

(51) Int. Cl.
 *H02G 3/08* (2006.01)
 *B21D 28/34* (2006.01)
 *H02G 3/14* (2006.01)
 *H02G 3/18* (2006.01)

(52) U.S. Cl.
 CPC ............ *H02G 3/085* (2013.01); *B21D 28/34* (2013.01); *H02G 3/14* (2013.01); *H02G 3/18* (2013.01)

(58) Field of Classification Search
 CPC ................... B21D 28/24; B21D 28/34; B21D 28/343–346
 USPC ................................................. 83/684–685
 See application file for complete search history.

(56) References Cited

U.S. PATENT DOCUMENTS

| | | | | | |
|---|---|---|---|---|---|
| 772,619 | A | * | 10/1904 | Kerngood | B21D 31/02 76/105 |
| 2,584,415 | A | * | 2/1952 | Barnett | B21D 28/34 83/133 |
| 2,735,489 | A | * | 2/1956 | Fowler | B21D 28/343 30/360 |
| 3,060,992 | A | * | 10/1962 | Hopp | B21D 35/00 72/373 |
| 3,269,011 | A | * | 8/1966 | Herrstrum | B21D 28/343 30/360 |
| D218,910 | S | * | 10/1970 | Gargrave | D15/140 |

(Continued)

FOREIGN PATENT DOCUMENTS

DE 101 61 092 B4 4/2004

OTHER PUBLICATIONS

American National Standard for Requirements for Watthour Meter Sockets, ANSI 12.7-2014, Aug. 14, 2014 (24 pgs).

(Continued)

*Primary Examiner* — Adam J Eiseman
*Assistant Examiner* — Richard D Crosby, Jr.
(74) *Attorney, Agent, or Firm* — STINSON LLP

(57) ABSTRACT

A punch set for use with a punch tool to punch material from a wall of an electrical box. The punch set has a punch with a cutting section, and a die defining a cavity that is configured to receive the cutting section. The cutting section may have an annular or circular portion and a plurality of keyway forming portions each extending radially from the annular or circular portion. The cutting section of the punch may be insertable into the cavity of the die in a single orientation. The die may have a protrusion receivable within a recess of the punch when the cutting section is received in the cavity. One of the die or punch may have an extension that is receivable in a single orientation within an opening in the other of the die or punch.

16 Claims, 35 Drawing Sheets

(56) References Cited

U.S. PATENT DOCUMENTS

| | | | | |
|---|---|---|---|---|
| 3,577,577 A * | 5/1971 | Zak | | H01R 4/26 |
| | | | | 470/163 |
| 4,272,579 A * | 6/1981 | Mitsui | | H02K 15/024 |
| | | | | 29/521 |
| 4,793,063 A * | 12/1988 | Ducret | | B26F 1/34 |
| | | | | 30/360 |
| 4,798,075 A * | 1/1989 | Killian | | B21D 53/20 |
| | | | | 29/896.9 |
| 5,052,207 A * | 10/1991 | Porucznik | | B26F 1/44 |
| | | | | 72/379.4 |
| 5,984,721 A | 11/1999 | Self, Jr. et al. | | |
| 5,992,285 A * | 11/1999 | Talarico | | B21D 28/34 |
| | | | | 83/684 |
| 6,634,616 B2 | 10/2003 | Belknap | | |
| 6,634,897 B2 | 10/2003 | Cykon et al. | | |
| 6,725,756 B2 * | 4/2004 | Brenneke | | B26F 1/14 |
| | | | | 83/697 |
| 6,981,327 B2 * | 1/2006 | Nordlin | | B21D 28/343 |
| | | | | 30/360 |
| 7,090,533 B1 | 8/2006 | Houck et al. | | |
| 7,204,113 B1 * | 4/2007 | Ghiran | | B21D 28/10 |
| | | | | 72/58 |
| 7,503,800 B2 | 3/2009 | Siglock et al. | | |
| 7,785,137 B2 | 8/2010 | Porter et al. | | |
| 7,850,483 B2 | 12/2010 | Siglock et al. | | |
| 7,980,781 B2 * | 7/2011 | Trice | | B25G 3/16 |
| | | | | 403/349 |
| 8,904,911 B2 * | 12/2014 | Nordlin | | B26F 1/14 |
| | | | | 30/360 |
| 8,978,431 B1 * | 3/2015 | Kernosky | | B21D 26/035 |
| | | | | 72/370.27 |
| 9,118,146 B2 | 8/2015 | Schulz et al. | | |
| 9,254,526 B2 * | 2/2016 | Nordlin | | B23P 11/00 |
| 9,393,711 B2 * | 7/2016 | Myrhum, Jr. | | B26F 1/36 |
| 9,595,846 B2 | 3/2017 | Siglock et al. | | |
| 10,849,646 B2 * | 12/2020 | Cho | | A61F 5/44 |
| 10,886,638 B1 | 1/2021 | McCarthy et al. | | |
| 10,965,108 B1 | 3/2021 | Hagen et al. | | |
| D921,721 S * | 6/2021 | Matzen | | B21G 3/28 |
| | | | | D15/136 |
| 11,471,931 B2 * | 10/2022 | Matzen | | B21G 3/28 |
| 11,491,679 B2 * | 11/2022 | McCollum | | B26F 1/14 |
| 2006/0229133 A1 * | 10/2006 | Lin | | B25B 15/005 |
| | | | | 470/63 |
| 2010/0139470 A1 * | 6/2010 | Buettner | | B21D 28/34 |
| | | | | 83/681 |
| 2010/0180744 A1 * | 7/2010 | Nordlin | | B21D 28/343 |
| | | | | 30/360 |
| 2011/0086122 A1 * | 4/2011 | Cai | | B21D 28/34 |
| | | | | 425/195 |
| 2011/0277610 A1 * | 11/2011 | Nordlin | | B21D 28/343 |
| | | | | 83/698.31 |
| 2013/0145915 A1 * | 6/2013 | Nordlin | | B26F 1/44 |
| | | | | 83/685 |
| 2014/0298962 A1 * | 10/2014 | Morris | | B26F 1/14 |
| | | | | 83/13 |
| 2014/0318344 A1 * | 10/2014 | Nordlin | | B26F 1/386 |
| | | | | 83/685 |
| 2015/0367400 A1 * | 12/2015 | Endo | | B21D 28/346 |
| | | | | 83/698.91 |
| 2016/0129605 A1 * | 5/2016 | Boerman | | B26D 5/005 |
| | | | | 83/868 |
| 2016/0375479 A1 * | 12/2016 | Ishikawa | | B21D 28/34 |
| | | | | 72/329 |
| 2019/0139379 A1 | 5/2019 | Siglock | | |
| 2019/0168276 A1 * | 6/2019 | Otsuka | | B21D 28/34 |
| 2020/0269303 A1 * | 8/2020 | Takahashi | | G01L 5/167 |

OTHER PUBLICATIONS

Product Flyer for A8112, "4 Inch Hub and Mounting Screws", Milbank Manufacturing Company (1 pg) [Applicant believes this information was published before the filing date of the present application.].

Product Flyer for A7514, "1 Inch Hub Kit", Milbank Manufacturing Company (1 pg) [Applicant believes this information was published before the filing date of the present application.].

Brochure for Greenlee 229, 231, RS232, 234 and 238 Connector Punches, Dec. 1994 (4 pgs).

Brochure for Greenlee Pushbutton Knockouts for Stainless Steel, Aug. 2019 (2 pgs).

* cited by examiner

PUNCH SET FOR ELECTRICAL BOX

CROSS-REFERENCE TO RELATED APPLICATIONS

Not applicable.

BACKGROUND OF THE INVENTION

Electrical boxes typically have openings to allow electrical conductors to enter and exit the box. The openings may be formed in the box during manufacture of the box and are often covered by knockouts that an installer can selectively remove depending on the desired location and size of the opening or openings needed. If an electrical box does not have an opening in a desired location or size, the installer may use a knockout punch tool to punch an opening in the box where needed.

A conduit hub adapter may be secured to an electrical box, such as a meter box, adjacent an opening in the electrical box. The conduit hub adapter is configured for connection to an electrical conduit that receives an electrical power conductor. The conduit hub adapter allows electric power utility personnel to connect an electrical conduit to the electrical box and route an electrical power conductor through the electrical conduit into the electrical box.

For example, FIG. 1 shows a conduit hub adapter 10 that is commonly used to connect an electrical conduit to a meter socket enclosure 12. The meter socket enclosure 12 has a top wall 14 with an opening 16. Four smaller openings, one of which is identified as 18, surround the larger opening 16. The openings 18 are configured to receive fasteners 20 for mounting the conduit hub adapter 10 to the top wall 14. The conduit hub adapter 10 includes a base plate 22 and a tube 24 extending upward from the base plate 22. The tube 24 has a threaded interior surface 26 that is configured to mate with external threads on an end of electrical conduit. Openings 28 at the corners of base plate 22 receive fasteners 20 for mounting the conduit hub adapter 10 to the top wall 14. An upturned edge 30 surrounding opening 18 is designed to prevent water from entering enclosure 12.

While conduit hub adapter 10 is generally suitable for its intended use, it requires the use of separate fasteners and a tool to join the fasteners to the enclosure 12. Further, while it is preferred for the conduit hub adapter 10 to be installed so that the tube 24 is adjacent the back wall of the enclosure 12, due to the configuration of the mounting holes 18 and 28 and base plate 22, an installer may incorrectly install the conduit hub adapter 10 so that the tube 24 is positioned adjacent the front wall or cover of the enclosure 12. In addition, conduit hub adapter 10 is typically made from aluminum and requires a separate adapter to be used with PVC electrical conduit. Conduit hub adapter 10 is also not tamper-resistant because the fasteners 20 are accessible from the exterior of the enclosure 12 and may be removed with a conventional tool. Thus, an unauthorized person may remove conduit hub adapter 10 to access the interior of enclosure 12.

BRIEF SUMMARY OF THE INVENTION

The invention is directed toward a punch set for use with a punch tool to punch material from a wall of an electrical box. The punch set has a punch with a cutting section and a die. The die defines a cavity that is configured to receive the cutting section of the punch.

In some embodiments, the cutting section of the punch has an annular or circular portion and a plurality of keyway forming portions each extending radially from the annular or circular portion. The cutting section of the punch is insertable into the cavity of the die in a single orientation. The plurality of keyway forming portions may include a first keyway forming portion and a second keyway forming portion, wherein the first keyway forming portion has a different shape than the second keyway forming portion. The plurality of keyway forming portions may be spaced apart from each other in a non-uniform manner such that a first distance between adjacent keyway forming portions is different than a second distance between adjacent keyway forming portions.

In some embodiments, either (i) the die has a base defining the cavity and an extension extending outward from the base, and the punch defines an opening that is configured to receive the extension in a single orientation, or (ii) the punch has an extension extending outward from the cutting section and the die defines an opening that is configured to receive the extension in a single orientation. A hole extending through the extension may be configured to receive a shaft of a punch tool.

In some embodiments, the die has an outer surface extending at least partially around the cavity and a protrusion extending outward from the outer surface. The punch has a recess configured to receive the protrusion when the cutting section of the punch is received within the cavity of the die.

In some embodiments, the punch set includes a fastener that is configured to threadably engage the shaft of the punch tool and engage the punch or the die when the shaft of the punch tool is inserted through the first opening of the punch and the second opening of the die.

The punch set allows an electrician to create an opening in an electrical box in the field. The opening may be configured for use with a conduit hub adapter that is securable to the electrical box quickly and securely without the use of tools or fasteners.

BRIEF DESCRIPTION OF THE DRAWINGS

Various exemplary embodiments of the present invention are described in detail below with reference to the attached drawing figures, wherein.

DETAILED DESCRIPTION OF EXEMPLARY EMBODIMENTS

Figure 1:
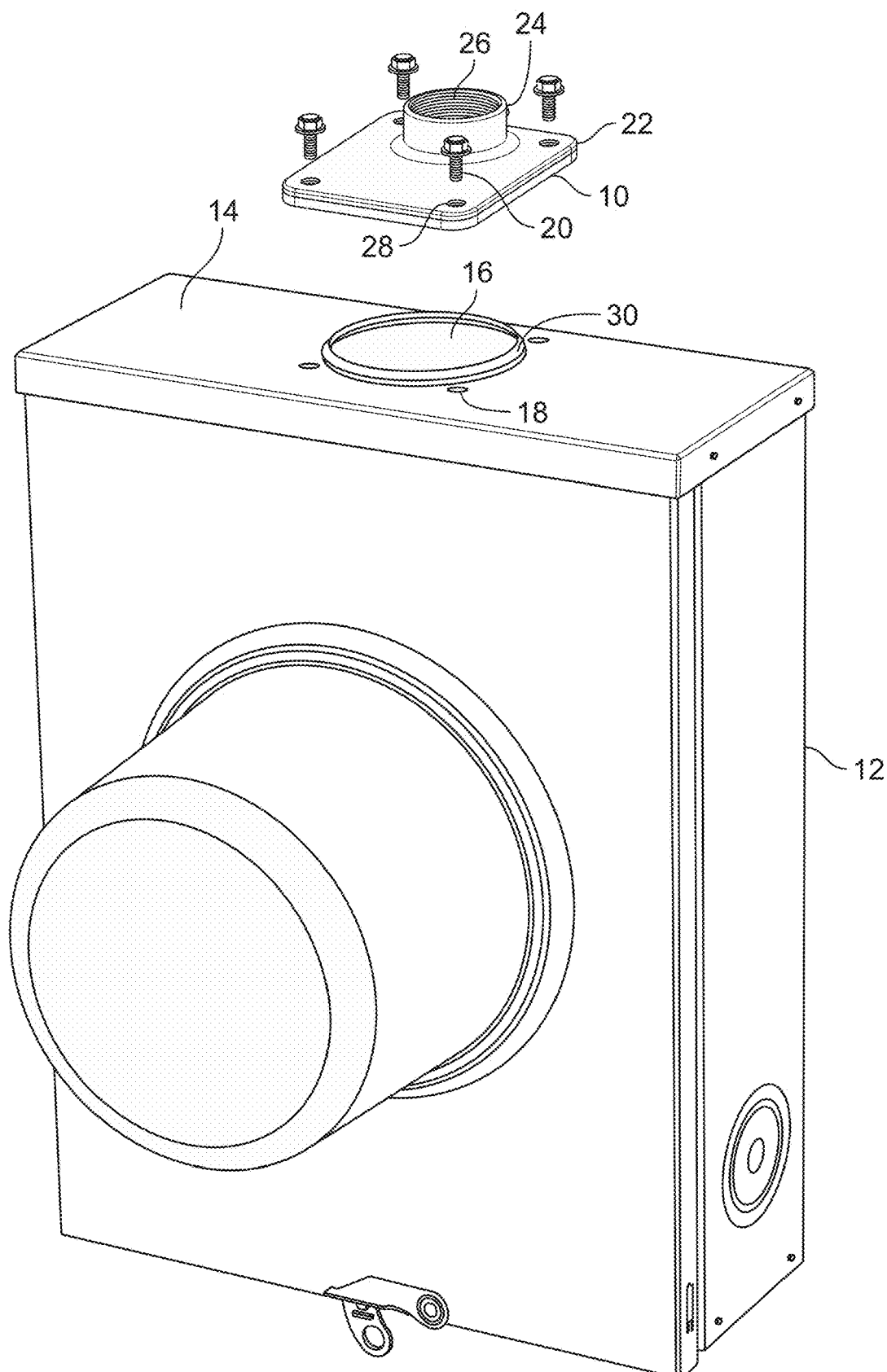
FIG. 1 is a perspective view of a prior art meter socket showing a meter socket enclosure and a conduit hub adapter in an exploded position.

The present invention is directed to a punch set for use with a punch tool to punch material from a wall of an electrical box. While the present invention will be described in detail below with reference to various exemplary embodiments, it should be understood that the invention is not limited to the specific configurations of these embodiments. In addition, although the exemplary embodiments are described as embodying several different inventive features, one skilled in the art will appreciate that any one of these features could be implemented without the others in accordance with the present invention.

1. First Exemplary Embodiment of Electrical Box

FIGS. 2-7 show a single-phase power system comprising an electric watt-hour meter 100 installed within a meter socket 200 in accordance with a first exemplary embodiment of electrical box for use with the conduit hub adapter 500 shown in FIGS. 23-27 and described herein. Meter socket 200 is known as a "ringless" meter socket and has a standardized form to allow the interchangeability of meters from various manufacturers without removing any wires or cables. While meter socket 200 may be employed for meters capable of continuous full load currents of 20 to 400 amperes, it is most typically utilized for residential applications of 200 amperes.

In this exemplary embodiment, meter 100 is an AMI (advanced metering infrastructure) meter that communicates with the electric power utility over an existing communication network, although other types of meters may also be used. The configuration of meter 100 is shown in greater detail in FIG. 2. As can be seen, meter 100 includes a cylindrical cover 102 that is made of glass, transparent plastic (e.g., polycarbonate), or any other suitable material. Cover 102 is secured to a meter base 104 so as to enclose various electronic components within the meter. These electronic components are well known to those skilled in the art.

Preferably, a seal (not shown) is used to provide a tight connection between cover 102 and meter base 104 and thereby protect the electronic components from environmental elements. An annular flange 116 extends radially outward from base 104 and includes a front rim 116a (shown in FIG. 4) that provides a mounting connection to a meter socket.

Meter 100 also includes two upper connector blades 106 (only one of which can be seen in FIG. 2) and two lower connector blades 108 (only one of which can be seen in FIG. 2) that extend outward from the back side of meter base 104. As described below, connector blades 106 and 108 are positioned to snap into the upper and lower meter jaws, respectively, of meter jaw block assemblies (such as of the meter jaw block assemblies 250 and 252 shown in FIG. 6, described below). A blade 110 also extends outward from the back side of meter base 104 and, as described below, is positioned to engage an electrical connector 266 used as a neutral reference (shown in FIG. 6). Two upper legs 112 (only one of which can be seen in FIG. 2) and two lower legs 114 (only one of which can be seen in FIG. 2) are also provided that protect blades 106, 108 and 110 when meter 100 is not installed.

Figure 2:
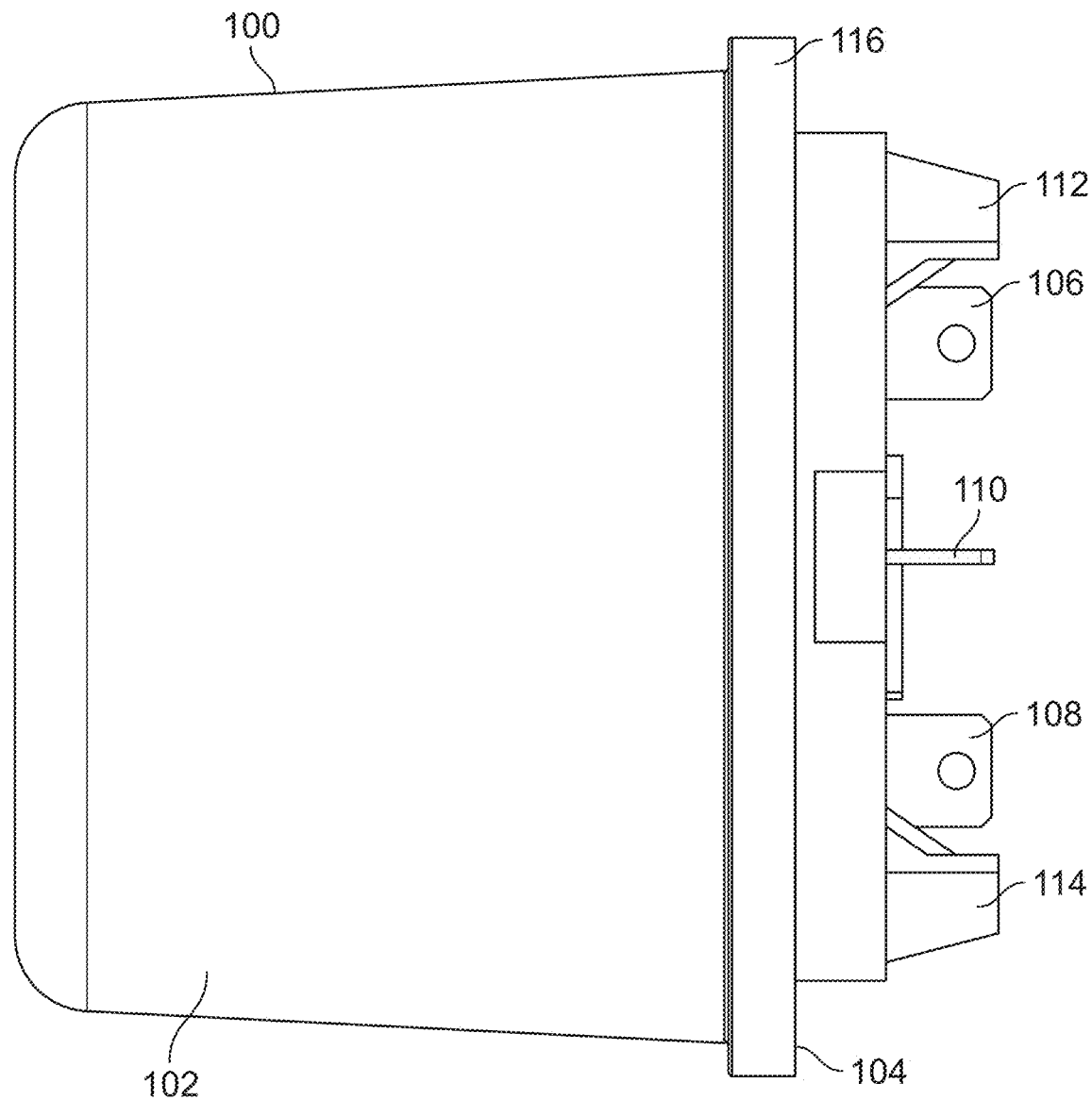
FIG. 2 is a right side elevational view of an electric watt-hour meter.
Figure 3:
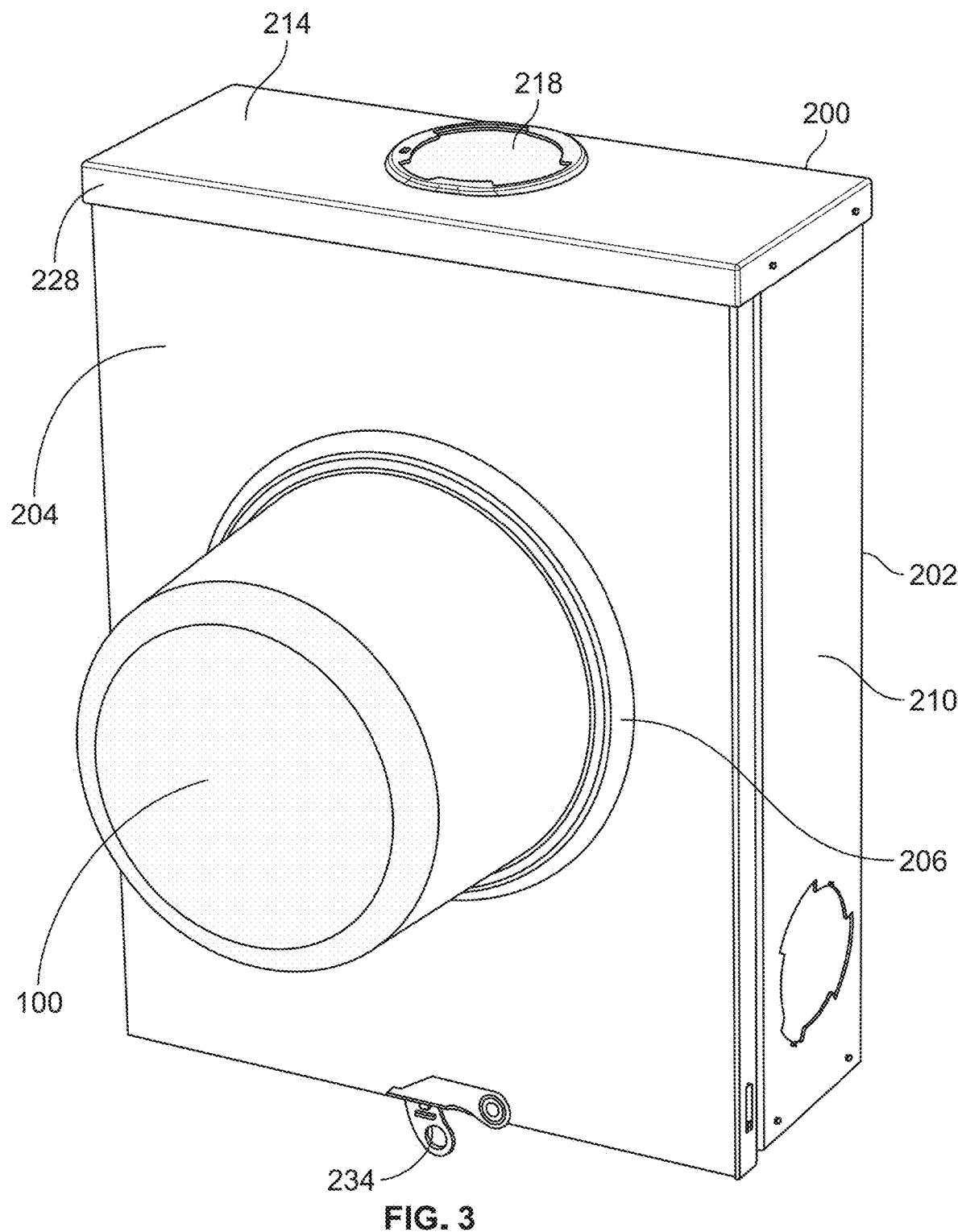
FIG. 3 is a perspective view of the electric watt-hour meter shown in FIG. 2 installed within a ringless meter socket of a single-phase power system in accordance with a first exemplary embodiment of electrical box enclosure for use with the conduit hub adapters described herein.
Figure 4:
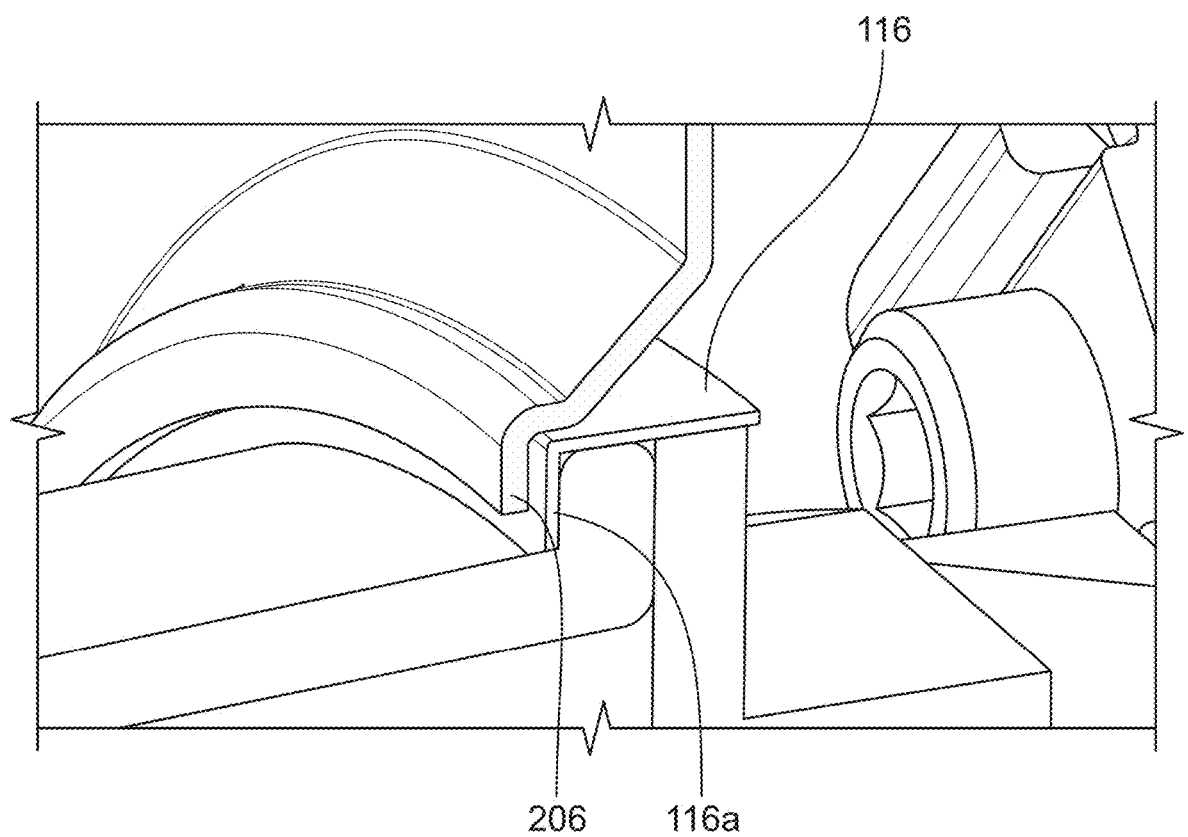
FIG. 4 is an enlarged cross-sectional view of the ringless meter socket and installed meter shown in FIG. 3 showing the cover of the meter socket enclosure retaining the meter in the meter socket.

Referring to FIG. 3, meter socket 200 includes an enclosure 202 having a front wall or cover 204 with a raised embossment 206 surrounding a circular opening through which meter 100 extends. As shown in FIG. 4, raised embossment 206 engages front rim 116a of annular flange 116 on meter 100 (also shown in FIG. 2) when cover 204 is latched to thereby retain meter 100 against the meter supports 268 and 270 (shown in FIG. 6) of meter socket 200, as described below. Thus, it can be appreciated that meter 100 can only be removed from meter socket 200 if cover 204 is removed from meter socket enclosure 202.

Figure 5:
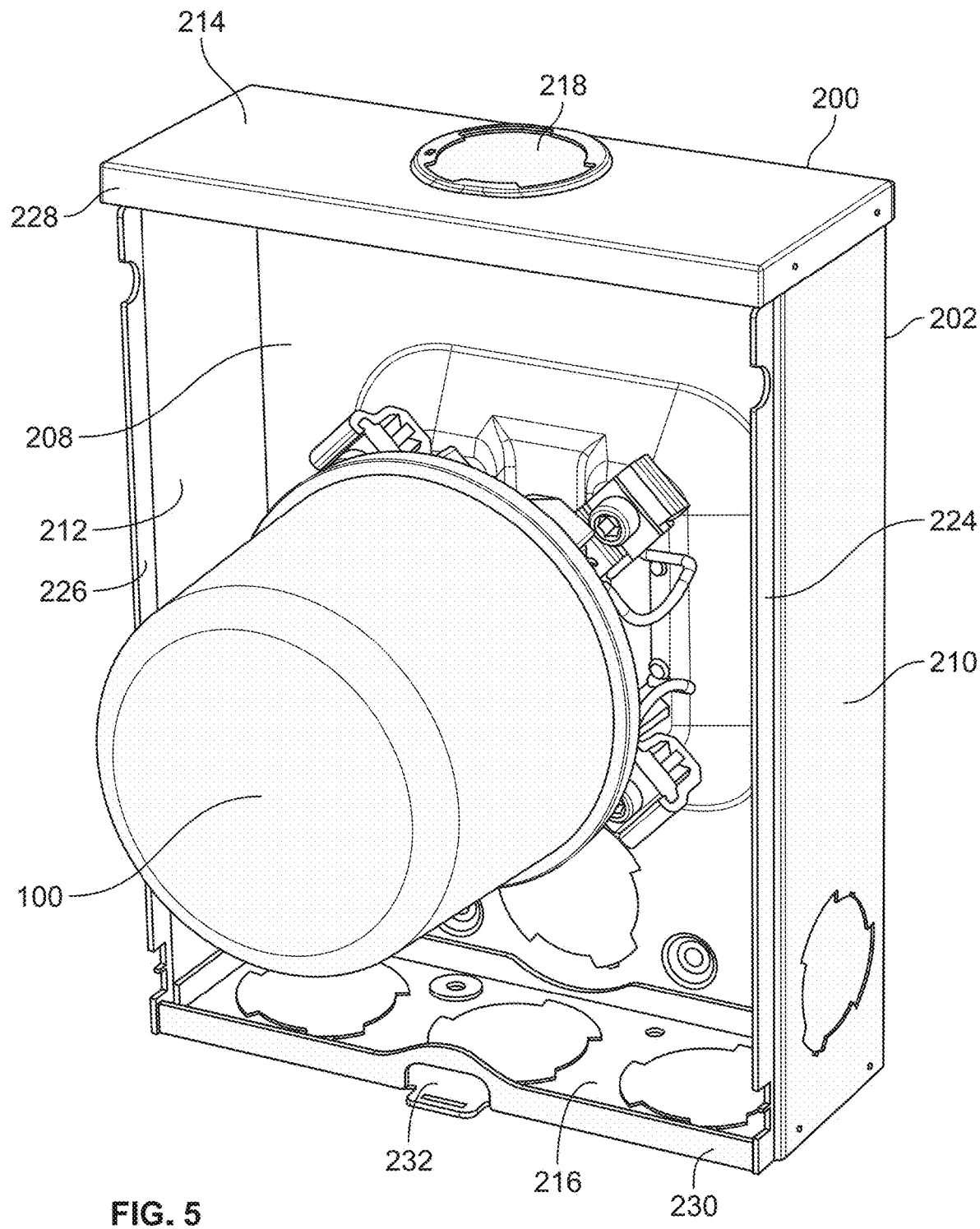
FIG. 5 is a perspective view of the meter socket and installed meter shown in FIG. 3 with the cover of the meter socket enclosure removed from the meter socket.
Figure 6:
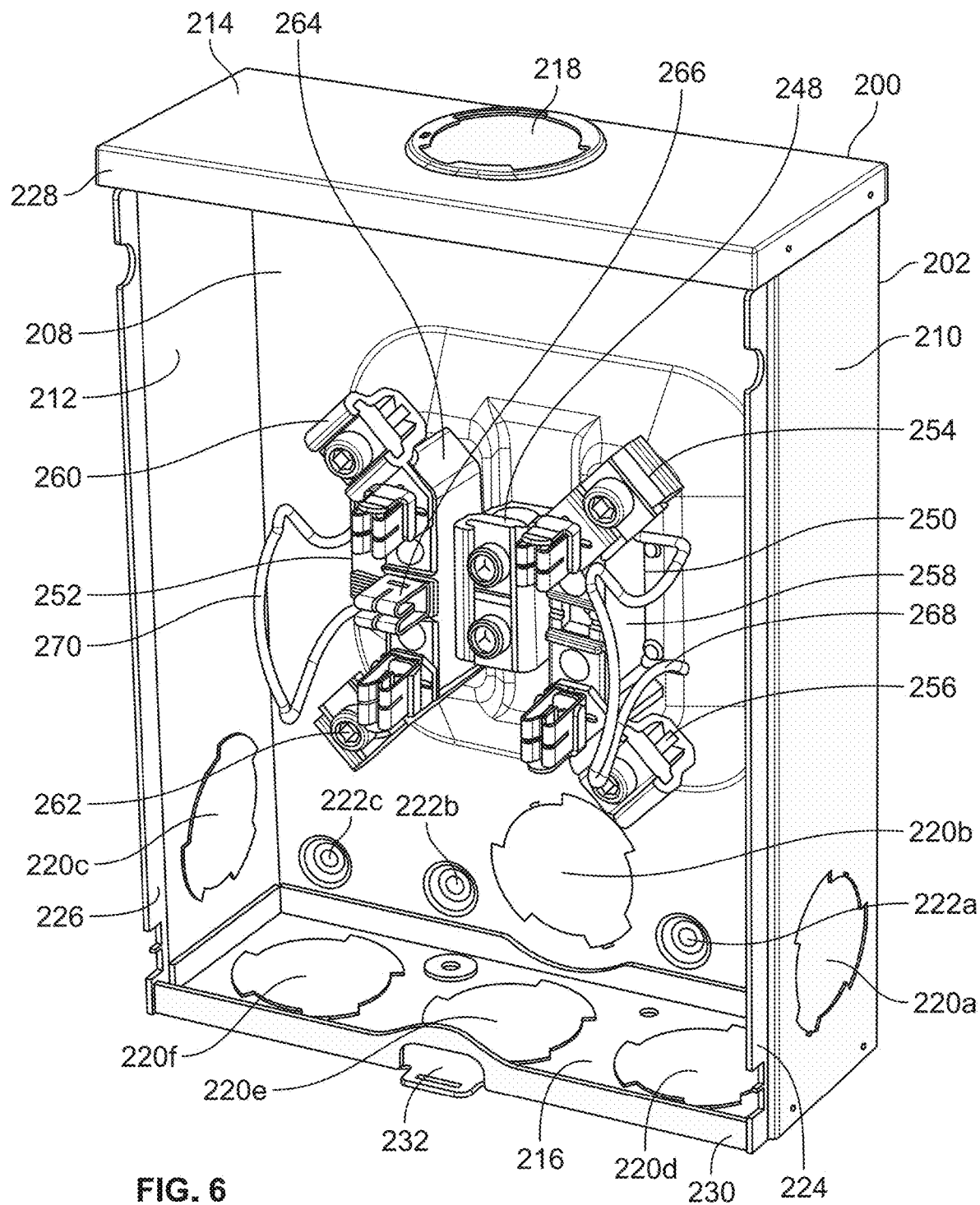
FIG. 6 is a perspective view of the meter socket shown in FIG. 5 with the meter removed from the meter socket.
Figure 7:
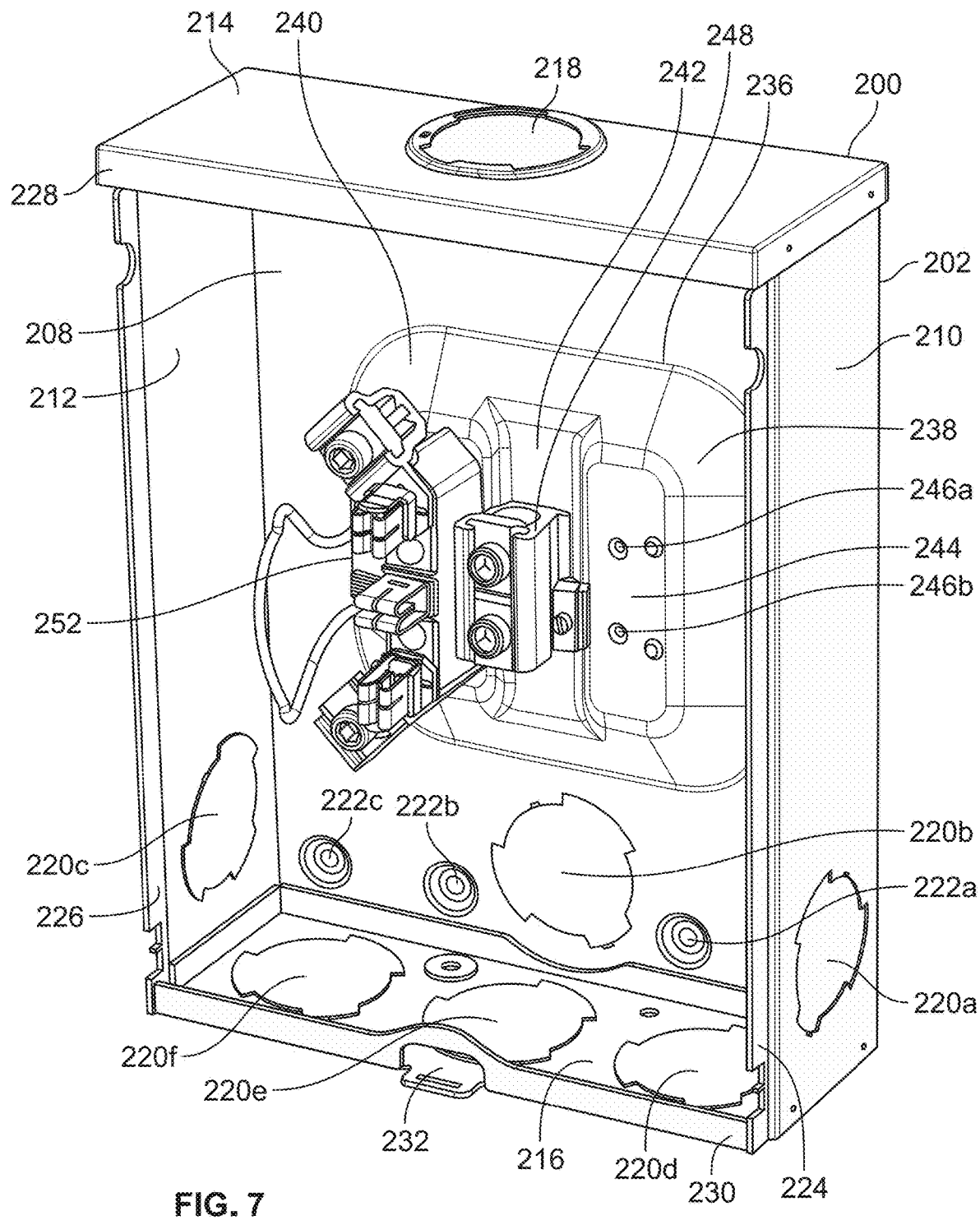
FIG. 7 is a perspective view of the meter socket shown in FIG. 6 with the right meter jaw block assembly removed from the meter socket.

As shown in FIGS. 5-7, meter socket enclosure 202 also includes a back wall 208, a pair of laterally spaced side walls 210 and 212, a top wall 214, and a bottom wall 216. Side walls 210 and 212 are integral with back wall 208 and are formed by bending side portions of an enclosure blank. Top and bottom walls 214 and 216 are formed as separate members and are secured to back wall 208 and side walls 210 and 212 by any suitable attachment means, such as by spot welding, fasteners, or the like. Of course, top and bottom walls 214 and 216 could alternatively be formed integral with back wall 208.

Top wall 214 is provided with an opening 218 to receive the power supply conductors (not shown) from the electric power utility. Opening 218 has substantially the same configuration as the opening 418 of meter socket enclosure 402 described below and shown in FIG. 21. Further, top wall 214 is configured for coupling to the conduit hub adapter 500 in the same manner as described below with respect to the meter socket enclosure 402 shown in FIG. 15. As best shown in FIGS. 6 and 7, bottom wall 216 and lower portions of side walls 210 and 212 and back wall 208 are provided with knockouts 220a-220f, which may be selectively opened to enable the power load conductors (not shown) to exit enclosure 202 for routing to a customer premises. Knockouts 220a-220f have substantially the same configuration as the knockouts 420a-f of meter socket enclosure 402 described below and shown in FIG. 15. Once any of knockouts 220a-220f have been removed, the conduit hub adapter 500 may be coupled to the back wall 208, side wall 210, side wall 212, or bottom wall 216 in the same manner as described below with respect to meter socket enclosure 402 shown in FIG. 28. Back wall 208 is provided with preformed holes 222a-222c that receive fasteners to secure enclosure 202 to a supporting wall.

To accommodate cover 204, side walls 210 and 212 include inset edges 224 and 226, respectively, while top and bottom walls 214 and 216 include top and bottom flanges 228 and 230, respectively. The upper edge of cover 204 fits under top flange 228 and the inturned side edges of cover 204 overlap inset edges 224 and 226. Bottom flange 230 underlies the bottom edge of cover 204. Bottom flange 230 is provided with a slotted tab 232 that engages a latch 234 rotationally fixed by a rivet to cover 204 (shown in FIG. 3). Electric power utility personnel use a custom tool to secure latch 234 on tab 232 and prevent unauthorized removal of cover 204 (and thus meter 100) from meter socket 200.

As best shown in FIG. 7, meter socket enclosure 202 includes a riser structure 236 that is formed by embossing or stamping back wall 208 between a set of appropriately shaped dies during manufacture of enclosure 202. Riser structure 236 has a pair of laterally spaced risers 238 and 240 separated by a recessed wall 242. Each of risers 238 and 240 includes a planar front wall 244 (only the front wall of riser 238 can be seen in FIG. 7) spaced forward of back wall 208. The spacing of each front wall 244 from back wall 208 is chosen to properly position two meter jaw block assemblies 250 and 252 (shown in FIG. 6) in relation to back wall 208. Each front wall 244 is also provided with holes 246a and 246b (only the holes of front wall 244 can be seen in FIG. 7) to receive respective mounting screws to thereby secure meter jaw block assemblies 250 and 252 to front walls 244 of risers 238 and 240. Recessed wall 242 forms a separation between risers 238 and 240 and includes holes (not shown) to receive a ground conductor connector 248. Recessed wall 242 is positioned in a recessed plane located between the plane of back wall 208 and the plane of front walls 244 of risers 238 and 240.

One skilled in the art will appreciate that other types of riser structures may also be used in accordance with the present invention. For example, a riser structure could be configured with a single riser (instead of risers 238 and 240 and recessed wall 242) of sufficient width for proper spacing of meter jaw block assemblies 250 and 252. Also, a separate riser structure could be provided that is secured to back wall 208. Further, a riser structure could be used that mounts three or more meter jaw block assemblies, such as for use with a three-phase system.

Referring to FIG. 6, meter socket 200 includes a first meter jaw block assembly 250 secured to the front wall of riser 238 and a second meter jaw block assembly 252 secured to the front wall of riser 240. Meter jaw block assembly 250 includes a top electrical connector 254 and a bottom electrical connector 256 each of which is mounted to an insulating mounting block 258. Similarly, meter jaw block assembly 252 includes a top electrical connector 260 and a bottom electrical connector 262 each of which is mounted to an insulating mounting block 264. It can be appreciated that electric utility power is provided at top electrical connectors 254 and 260 and customer power is provided at bottom electrical connectors 256 and 262. Mounting blocks 258 and 264 function to insulate top electrical connectors 254 and 260 and bottom electrical connectors 256 and 262 from enclosure 202. Optionally, a fifth electrical connector 266 may be mounted within an opening in the center of mounting block 264 and used as a neutral reference for certain types of service. Meter jaw block assemblies 250 and 252 also include meter supports 268 and 270 that provide a mounting surface and transient suppression ground terminal for meter 100.

2. Second Exemplary Embodiment of Electrical Box

FIGS. 8-14 show a single-phase power system comprising an electric watt-hour meter 100 (i.e., the same meter described above in connection with the first exemplary embodiment and shown in FIG. 2) installed within a meter socket 300 in accordance with a second exemplary embodiment of electrical box for use with the conduit hub adapter 500 shown in FIGS. 23-27 and described herein. Meter socket 300 is known as a "ring-type" meter socket and has a standardized form to allow the interchangeability of meters from various manufacturers without removing any wires or cables. While meter socket 300 may be employed for meters capable of continuous full load currents of 20 to 400 amperes, it is most typically utilized for residential applications of 200 amperes.

Figure 8:
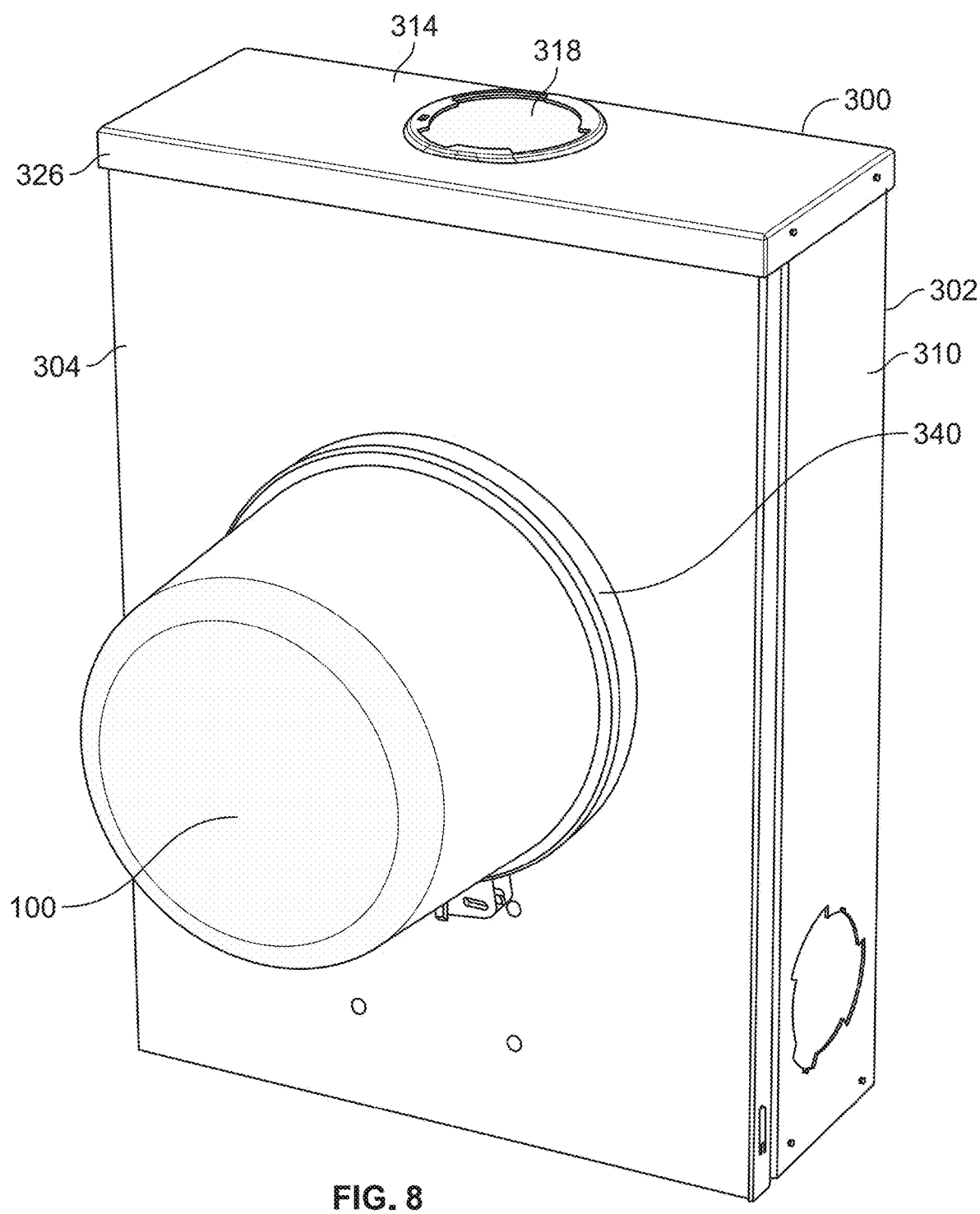
FIG. 8 is a perspective view of the electric watt-hour meter shown in FIG. 2 installed within a ring-type meter socket of a single-phase power system in accordance with a second exemplary embodiment of electrical box enclosure for use with the conduit hub adapters described herein.
Figure 11:
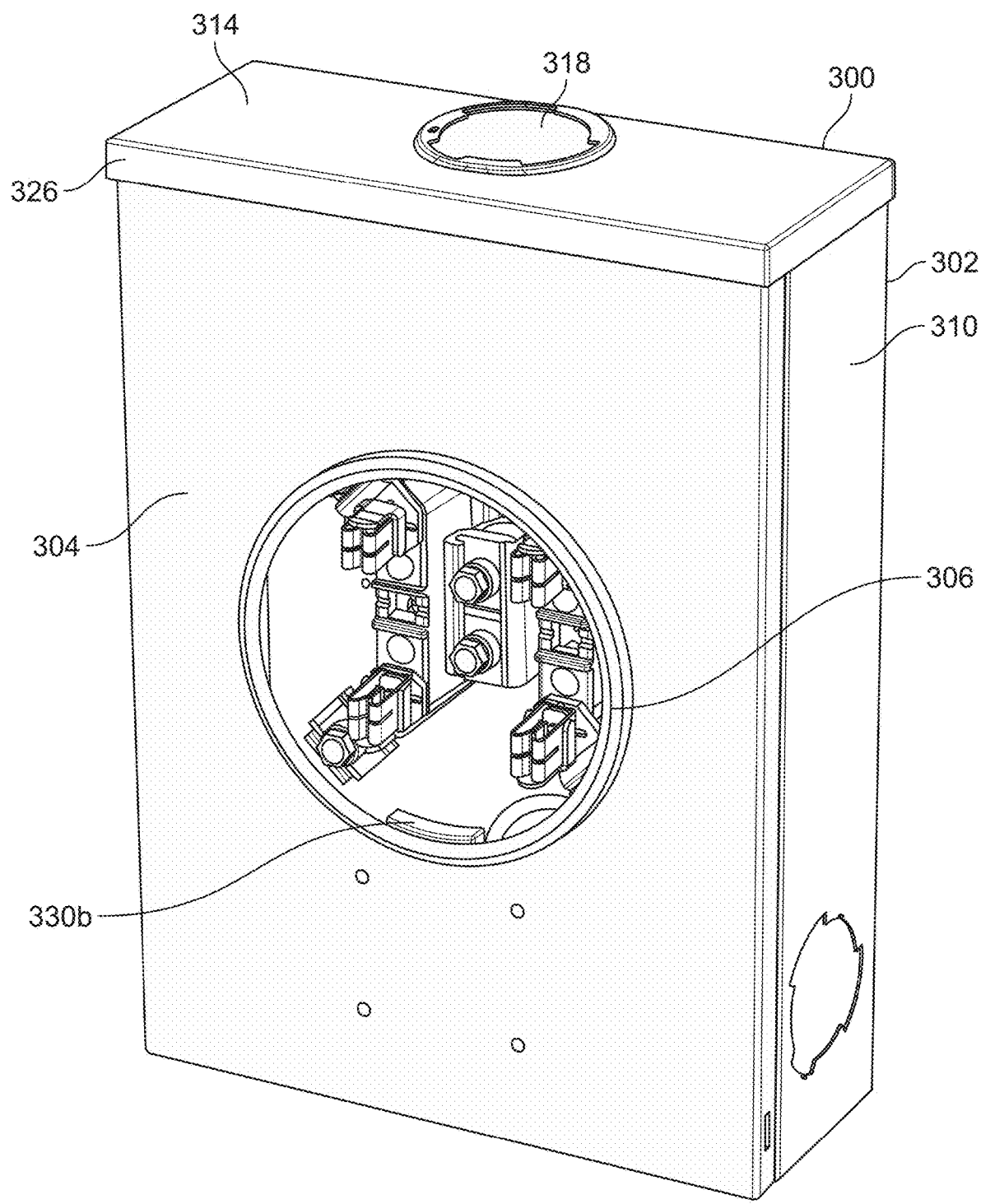
FIG. 11 is a perspective view of the meter socket shown in FIG. 8 with the sealing ring and meter removed from the meter socket.
Figure 12:
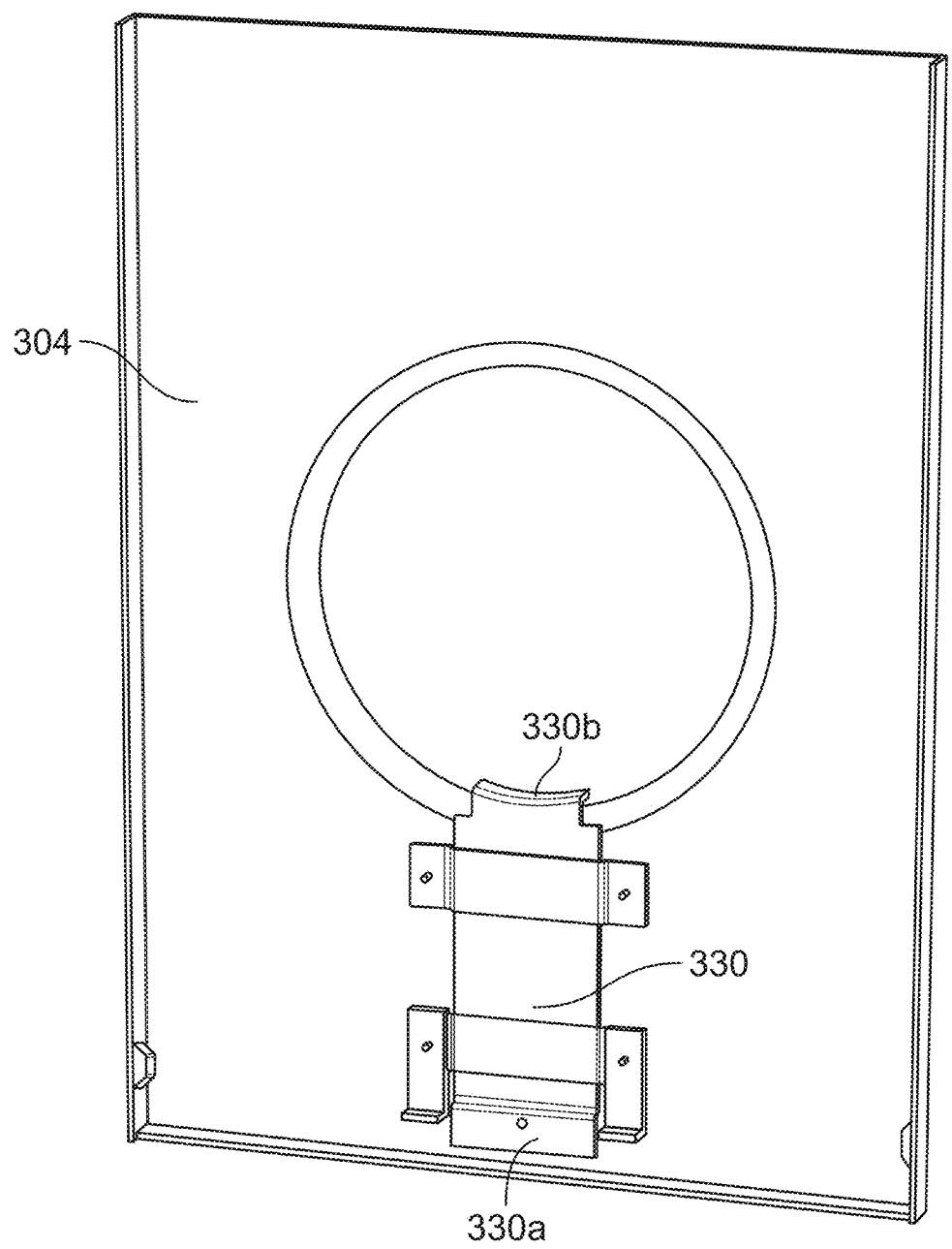
FIG. 12 is a perspective view of the back side of the cover of the meter socket enclosure shown in FIG. 11.
Figure 13:
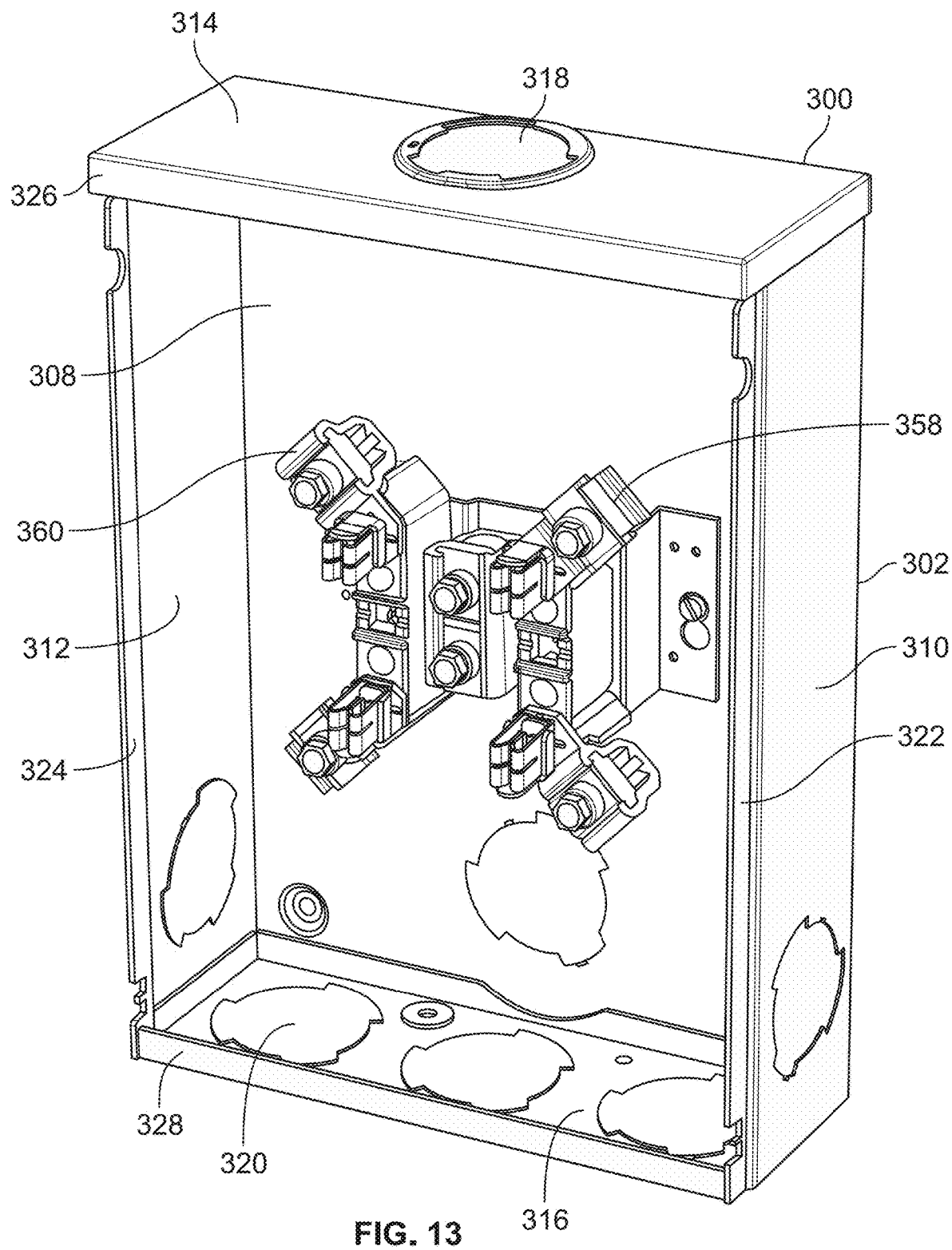
FIG. 13 is a perspective view of the meter socket shown in FIG. 11 with the cover of the meter socket enclosure removed from the meter socket.
Figure 14:
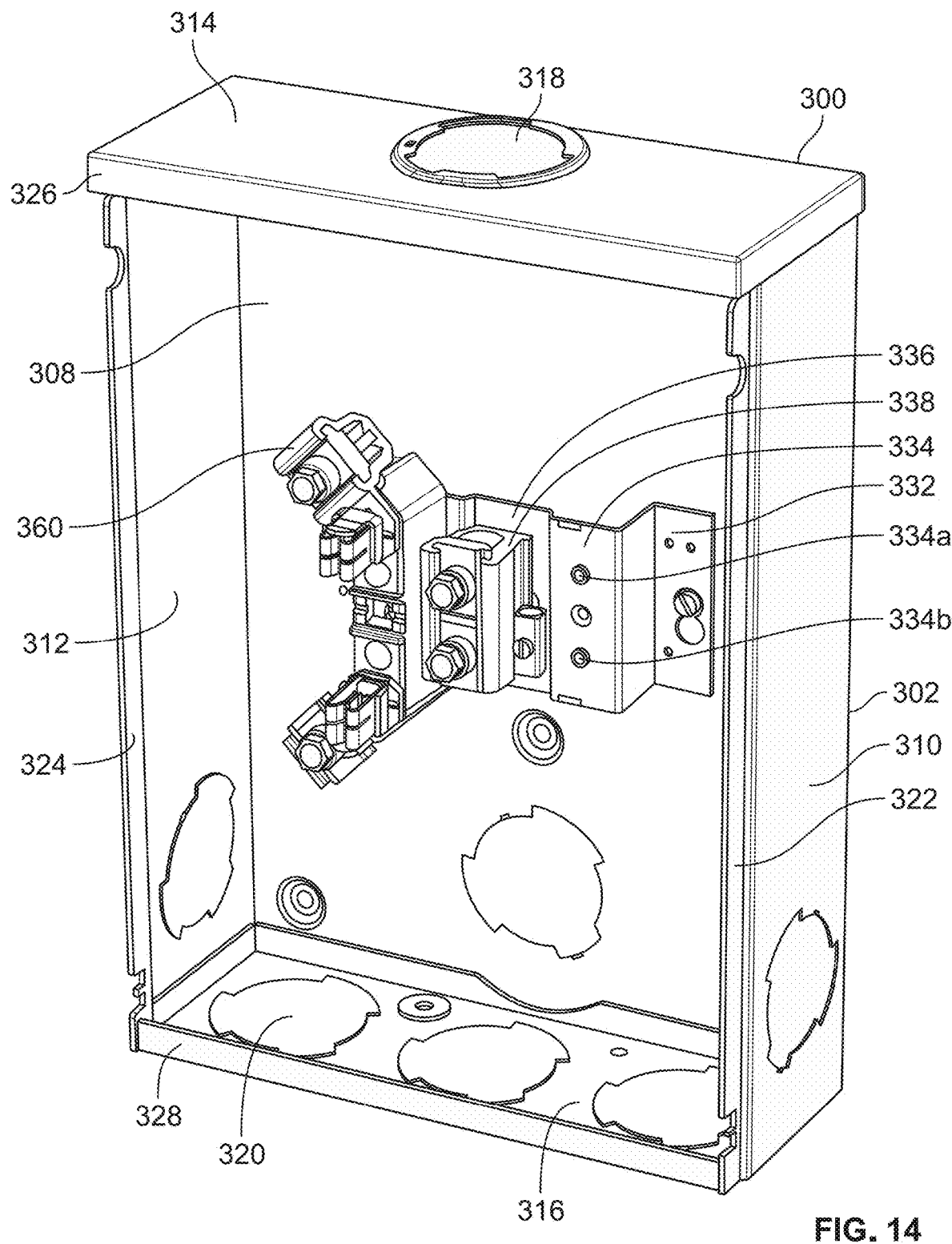
FIG. 14 is a perspective view of the meter socket shown in FIG. 13 with the right meter jaw block assembly removed from the meter socket.

Referring to FIGS. 8 and 11, meter socket 300 includes an enclosure 302 having a front wall or cover 304 with an outwardly rolled curl 306 (best shown in FIG. 11) surrounding a circular opening through which meter 100 extends. As shown in FIGS. 13 and 14, meter socket enclosure 302 also includes a back wall 308, a pair of laterally spaced side walls 310 and 312, a top wall 314, and a bottom wall 316. Side walls 310 and 312 are integral with back wall 308 and are formed by bending side portions of an enclosure blank. Top and bottom walls 314 and 316 are formed as separate members and are secured to back wall 308 and side walls 310 and 312 by any suitable attachment means, such as by spot welding, fasteners, or the like. Of course, top and bottom walls 314 and 316 could alternatively be formed integral with back wall 308.

Top wall 314 is provided with an optional opening 318 to receive the power supply conductors (not shown) from the electric power utility. Opening 318 has substantially the same configuration as the opening 418 of meter socket enclosure 402 described below and shown in FIG. 21. Further, top wall 314 is configured for coupling to the conduit hub adapter 500 in the same manner as described below with respect to the meter socket enclosure 402 shown in FIG. 15. Bottom wall 316 and lower portions of side walls 310 and 312 and back wall 308 are provided with knockouts 320 (only one of which is labeled in FIGS. 13 and 14), which may be selectively opened to enable the power load conductors (not shown) to exit enclosure 302 for routing to a customer premises. Knockouts 320 have substantially the same configuration as the knockouts 420a-f of meter socket enclosure 402 described below and shown in FIG. 15. Once any of knockouts 320 have been removed, the conduit hub adapter 500 may be coupled to the back wall 308, side wall 310, side wall 312, or bottom wall 316 in the same manner as described below with respect to meter socket enclosure 402 shown in FIG. 15. Back wall 308 is provided with preformed holes that receive fasteners to secure enclosure 302 to a supporting wall.

To accommodate cover 304, side walls 310 and 312 include in set edges 322 and 324, respectively, while top and bottom walls 314 and 316 include top and bottom flanges 326 and 328, respectively. The upper edge of cover 304 fits under top flange 326 and the inturned side edges of cover 304 overlap in set edges 322 and 324. Bottom flange 328 underlies the bottom edge of cover 304. Cover 304 is secured in place by a sliding latch bolt 330 (best shown in FIG. 12) having a bottom tab 330a that engages behind bottom flange 328 when sliding latch bolt 330 is moved in the downward direction. Sliding latch bolt 330 also has a lift-up tab 330b that may be moved in the upward direction in order to enable the removal of cover 304.

As best shown in FIG. 14, meter socket 300 includes a separate riser structure 332 that is secured to back wall 308. Riser structure 332 has a pair of laterally spaced riser walls (only the right riser wall 334 can be seen in FIG. 14) separated by a recessed wall 336. The spacing of the riser walls from back wall 308 is chosen to properly position two meter jaw block assemblies 358 and 360 (shown in FIG. 13) in relation to back wall 308. Each riser wall is also provided with holes (only the holes 334a and 334b of right riser wall 334 can be seen in FIG. 14) to receive respective mounting screws to thereby secure meter jaw block assemblies 358 and 360 to the riser walls. Recessed wall 336 forms a separation between the riser walls and includes holes (not shown) to receive a ground conductor connector 338. Recessed wall 336 is positioned in a recessed plane located between the plane of back wall 308 and the plane of the riser walls. Of course, one skilled in the art will appreciate that other types of riser structures may also be used in accordance with the present invention, such as the riser structure of the first exemplary embodiment.

Figure 9:
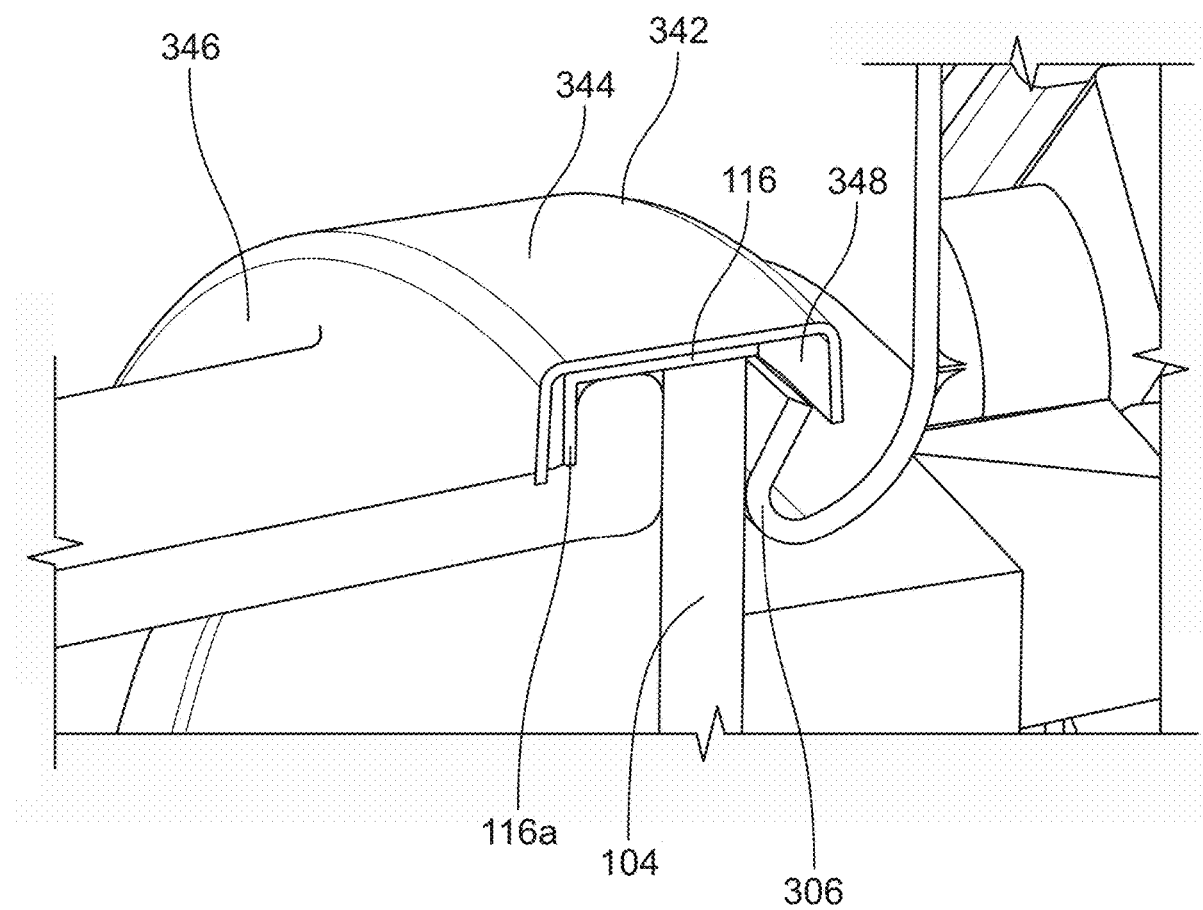
FIG. 9 is an enlarged cross-sectional view of the ring-type meter socket and installed meter shown in FIG. 8 showing the sealing ring retaining the meter in the meter socket.
Figure 10:
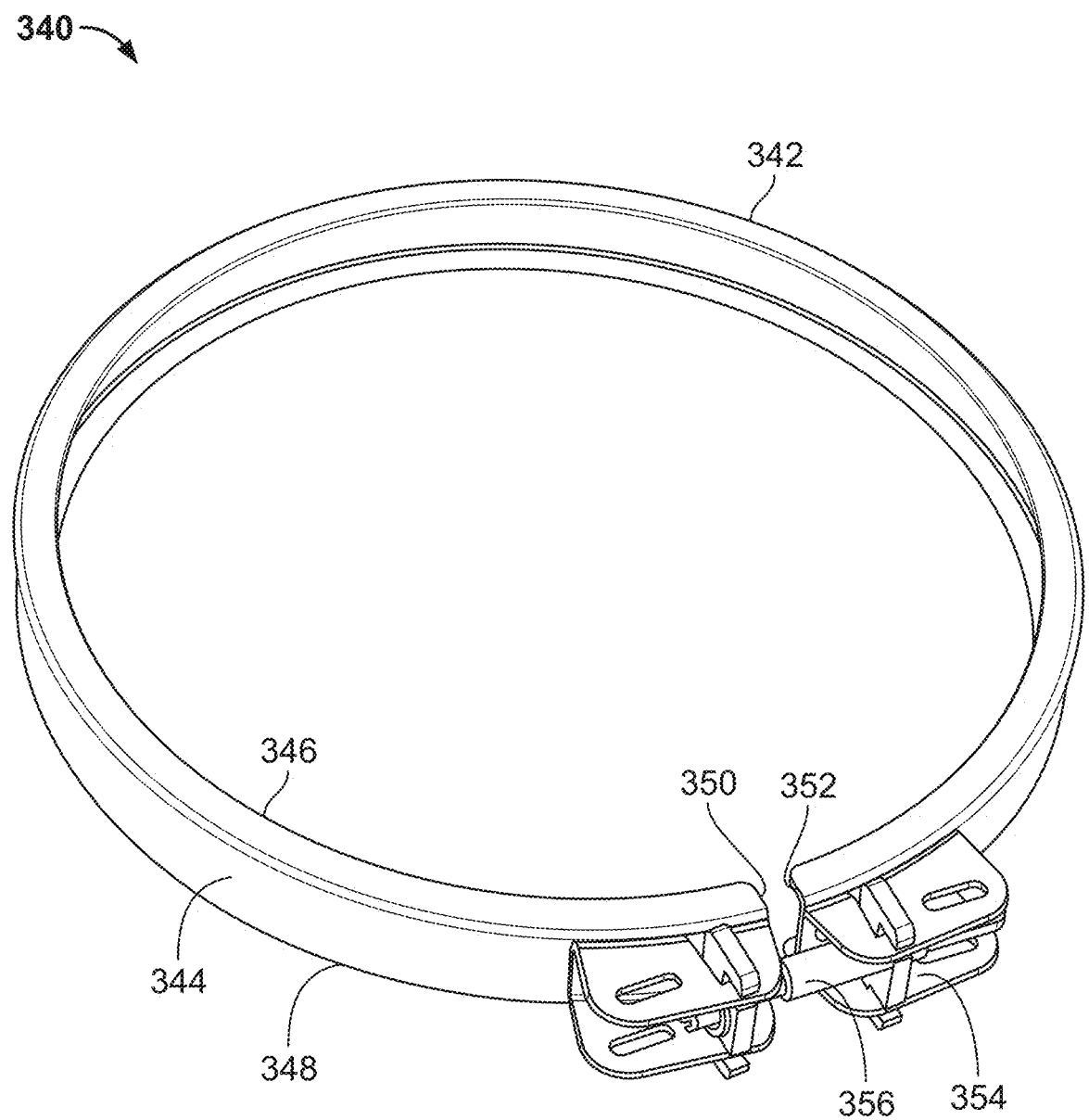
FIG. 10 is a perspective view of the sealing ring of the meter socket shown in FIG. 8.

Referring again to FIG. 8, meter socket 300 includes a sealing ring 340 that seals meter 100 to meter socket 300. As shown in FIG. 9, sealing ring 340 comprises a ring-shaped annular band 342 having a side wall 344 and a pair of depending rims 346 and 348. As best shown in FIG. 10, annular band 342 terminates in spaced ends 350 and 352 that are extensible and retractable relative to each other as annular band 342 is tightened or allowed to expand. A conventional screw-type lock mechanism 354 is secured to side wall 344 of annular band 342 adjacent to ends 350 and 352 by means of rivets, welds, or any other suitable mechanical fasteners, and a screw 356 enables tightening and expansion of annular band 342. Of course, other types of lock mechanisms may also be used in accordance with the present invention.

Referring to FIG. 9, it can be seen that meter base 104 seats against curl 306 of cover 304 when meter 100 is installed within meter socket 300. Sealing ring 340 is then positioned over annular flange 116 of meter 100 such that front rim 346 of annular band 342 engages front rim 116a of annular flange 116 and back rim 348 of annular band 342 extends over the edge of curl 306. Electric power utility personnel then use a custom tool to tighten screw 356 of lock mechanism 354 causing annular band 342 to tighten and prevent unauthorized removal of cover 304 (and thus meter 100) from meter socket 300. Of course, if sealing ring 340 is removed, meter 100 can be removed from meter socket 300 without removal of cover 304 from meter socket enclosure 302.

Referring to FIGS. 13 and 14, meter socket 300 includes a first meter jaw block assembly 358 secured to the right riser wall and a second meter jaw block assembly 360 secured to the left riser wall. Each of meter jaw block assemblies 358 and 360 is structurally the same as meter jaw block assembly 250 (shown in FIG. 6) described above in connection with the first exemplary embodiment, including the configuration of the top and bottom electrical connectors. As such, meter jaw block assemblies 358 and 360 will not be further described in connection with this second exemplary embodiment.

3. Third Exemplary Embodiment of Electrical Box

FIGS. 15-22 show portions of a third exemplary embodiment of electrical box 400 for use with the conduit hub adapter 500 shown in FIGS. 23-27. Electrical box 400 is a meter socket like the meter sockets 200 and 300 described above. The front wall or cover of electrical box 400 and the internal components of the electrical box 400 (e.g., the riser structure and meter jaw block assemblies) are not shown in FIGS. 15-22 but may be substantially the same as described above for meter socket 200 or meter socket 300.

Electrical box 400 includes a meter socket enclosure 402, which includes a front wall or cover (not shown), a back wall 408, a pair of laterally spaced side walls 410 and 412, a top wall 414, and a bottom wall 416. Side walls 410 and 412 are integral with back wall 408 and are formed by bending side portions of an enclosure blank. Top and bottom walls 414 and 416 are formed as separate members and are secured to back wall 408 and side walls 410 and 412 by any suitable attachment means, such as by spot welding, fasteners, or the like. Of course, top and bottom walls 414 and 416 could alternatively be formed integral with back wall 408.

Top wall 414 is provided with an opening 418 (FIG. 21) to receive the power supply conductors (not shown) from the electric power utility. A conduit hub adapter 500 is joined to top wall 414 adjacent opening 418 as described in more detail below. Bottom wall 416 and lower portions of side walls 410 and 412 and back wall 408 are provided with knockouts 420a-420f, which may be selectively opened to enable the power load conductors (not shown) to exit enclosure 402 for routing to a customer premises. Knockout 420e is shown as being opened in FIGS. 15-17 with a second conduit hub adapter 501 joined to bottom wall 416 adjacent the knockout opening as described in more detail below. Back wall 408 is provided with preformed holes 422a-422f (FIG. 17) that receive fasteners to secure enclosure 402 to a supporting wall.

To accommodate the cover (not shown), side walls 410 and 412 include inset edges 424 and 426, respectively, while top and bottom walls 414 and 416 include top and bottom flanges 428 and 430, respectively. The upper edge of the cover (not shown) fits under top flange 428 and the inturned side edges of the cover (not shown) overlap inset edges 424 and 426. Bottom flange 430 underlies the bottom edge of the cover (not shown). Bottom flange 430 is provided with a slotted tab 432 that engages a latch (not shown) rotationally fixed by a rivet to the cover (not shown) in a similar manner as shown in FIG. 3 for meter socket 200. Electric power utility personnel use a custom tool to secure the latch (not shown) on tab 432 and prevent unauthorized removal of the cover from electrical box 400.

Figure 20:
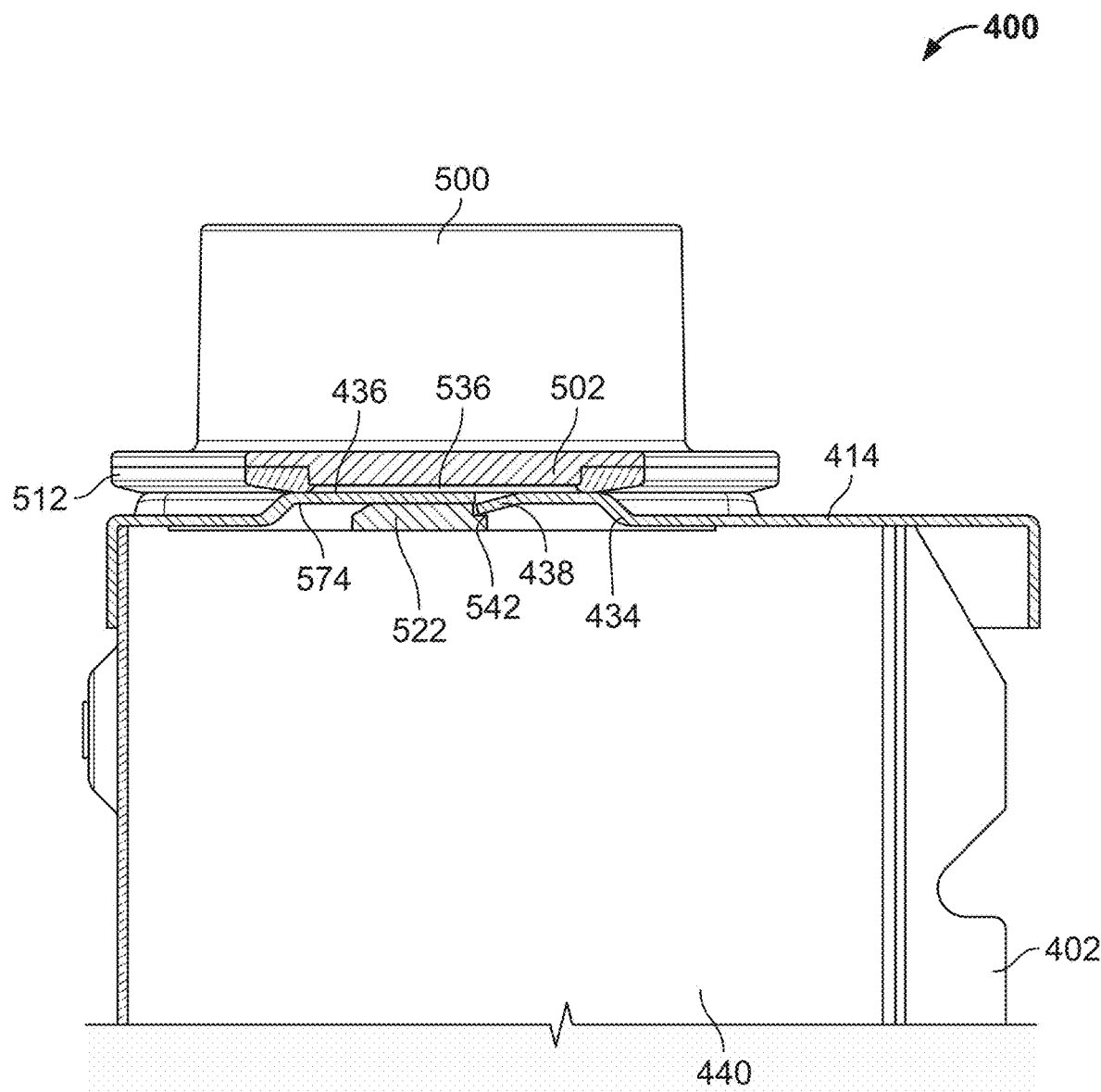
FIG. 20 is a cross-sectional view taken through the line 20-20 shown in FIG. 16 with the conduit hub adapter shown in an engaged position.
Figure 21:
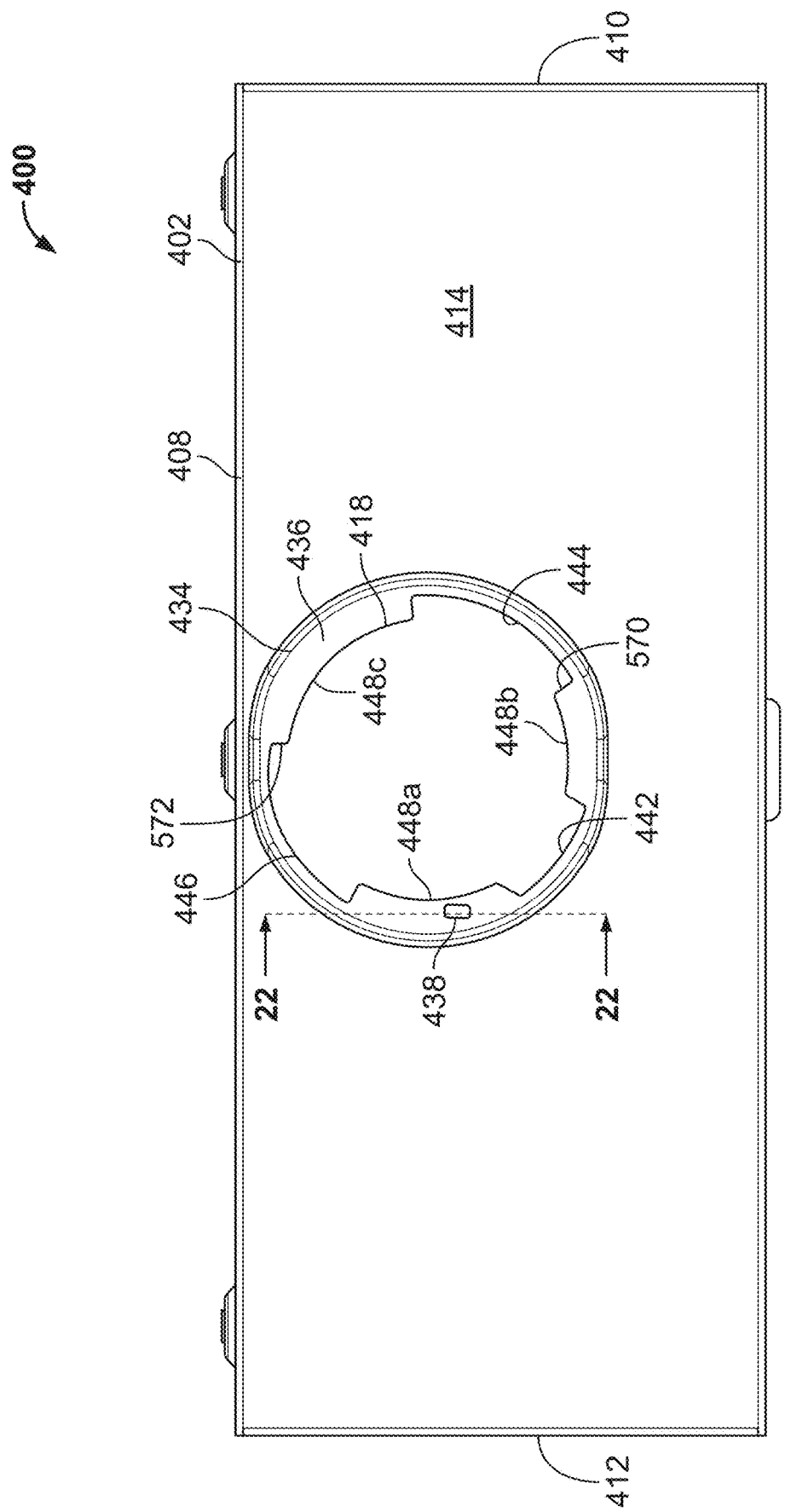
FIG. 21 is a top plan view of the meter socket enclosure shown in FIG. 15 without the conduit hub adapter.
Figure 22:
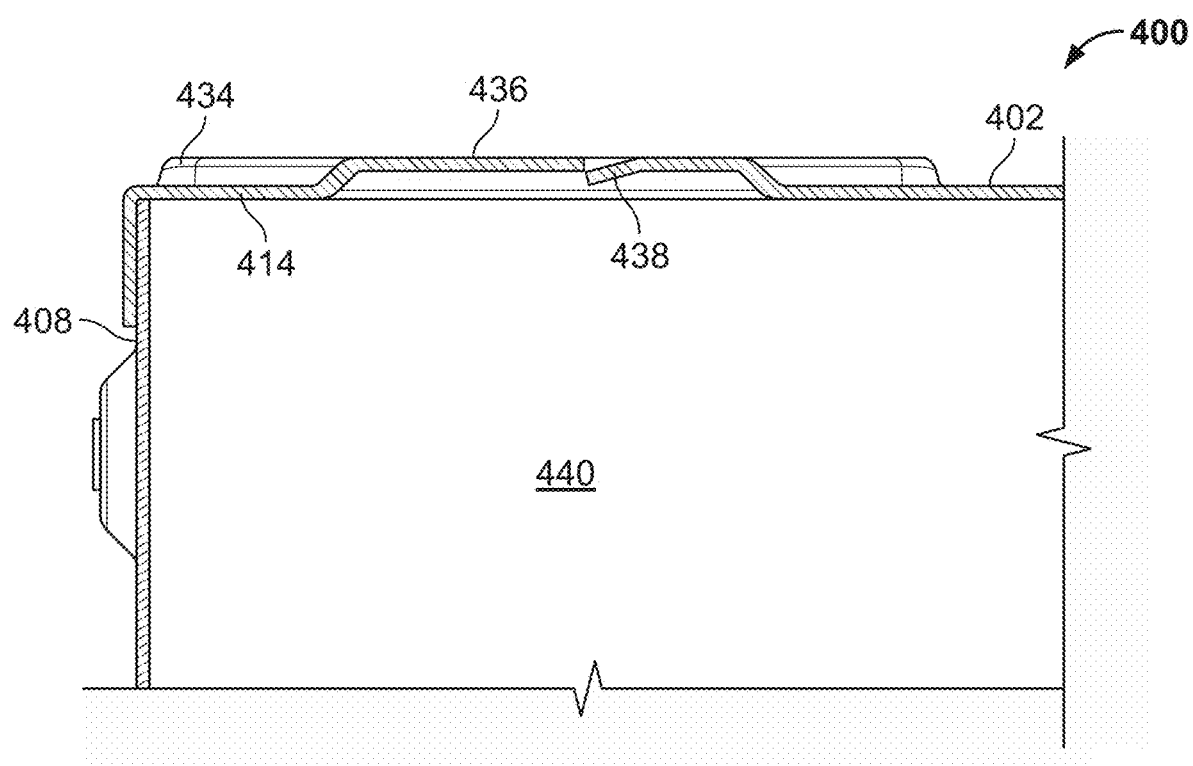
FIG. 22 is a cross-sectional view taken through the line 22-22 shown in FIG. 21.
Figure 23:
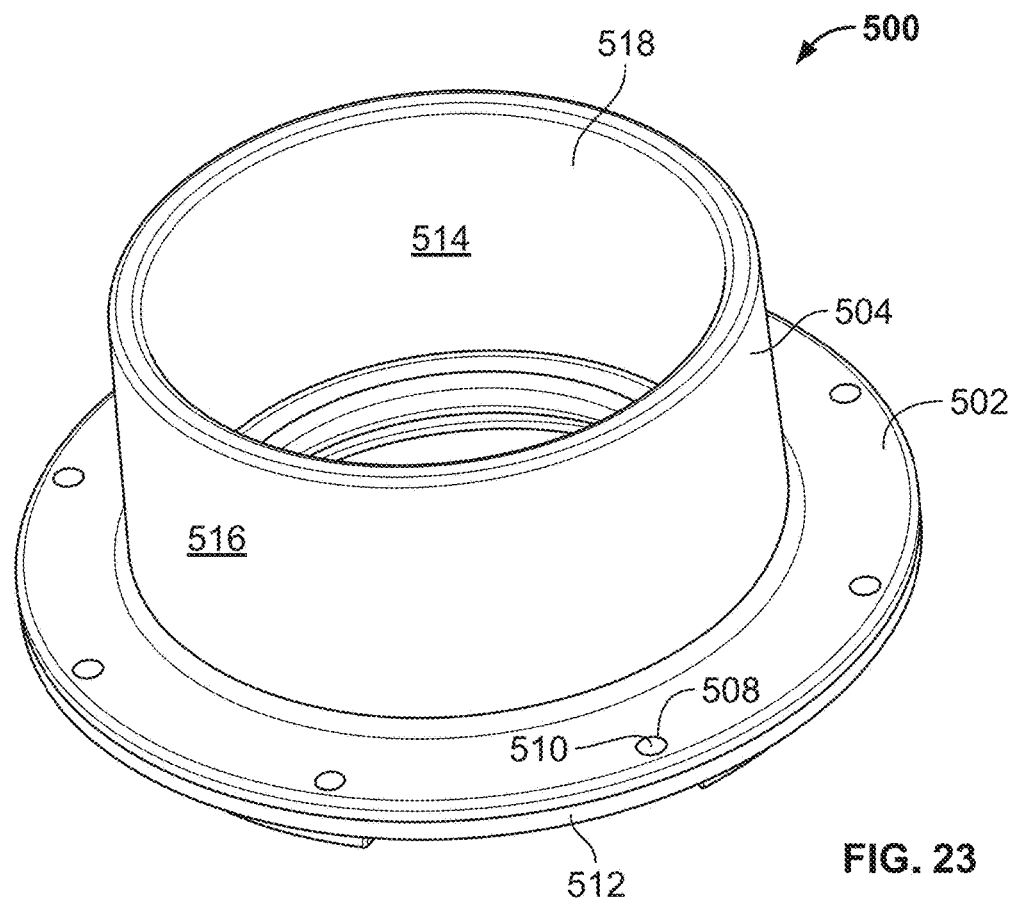
FIG. 23 is a perspective view of the conduit hub adapter shown in FIG. 15.

Referring to FIGS. 21 and 22, top wall 414 includes a raised embossment 434 positioned adjacent back wall 408 and substantially centered between side walls 410 and 412. Opening 418 is positioned in raised embossment 434 with an upper surface 436 of raised embossment 434 surrounding opening 418. Top wall 414 includes a retainer 438 that extends downward from the upper surface 436 adjacent opening 418 (see FIG. 22). The retainer 438 extends downward into an interior space 440 of enclosure 402 that is defined by the front wall (not shown), back wall 408, side walls 410 and 412, top wall 414, and bottom wall 416. The retainer 438 may be formed by cutting top wall 414 around a portion of the peripheral edge of the retainer 438 and leaving a portion of retainer 438 attached to the top wall 414. The retainer 438 may then be pressed downward to bend it along the portion that is attached to the top wall 414. The retainer 438 is configured for securing the conduit hub adapter 500 to the meter socket enclosure 402, or retaining the conduit hub adapter 500 in place with respect to the meter socket enclosure 402, when the conduit hub adapter is in the engaged position shown in FIG. 20 and described in more detail below.

The edge of enclosure 402 surrounding opening 418 includes a first keyed section 442, a second keyed section 444, and a third keyed section 446. The edge further includes three curved sections 448a-c each of which being positioned between a pair of adjacent keyed sections 442, 444, and 446. The curved sections 448a-c are generally portions of a circle with a central axis that is aligned with a central axis of opening 418. Thus, the curved sections 448a-c are generally equidistant from the central axis of opening 418. The first, second, and third keyed sections 442, 444, and 446 each extend radially outward from the curved sections 448a-c. Further, each of the first, second, and third keyed sections 442, 444, and 446 has a different shape, which ensures that conduit hub adapter 500 may only be joined to top wall 414 in a single orientation, as described in more detail below. The retainer 438 is positioned between the first keyed section 442 and the third keyed section 446.

In an alternative configuration, the keyed sections 442, 444, and 446 may extend radially inward from the curved sections 448a-c. Further, enclosure 402 may have more or less than three keyed sections 442, 444, and 446. For example, enclosure 402 may have first and second keyed sections 442 and 444 with keyed section 446 being omitted. In addition, each of the keyed sections 442, 444, and 446 may have the same shape and be positioned in an asymmetrical pattern around the central axis of opening 418 so that the conduit hub adapter 500 may be joined to top wall 414 in a single orientation as described in more detail below.

Figure 15:
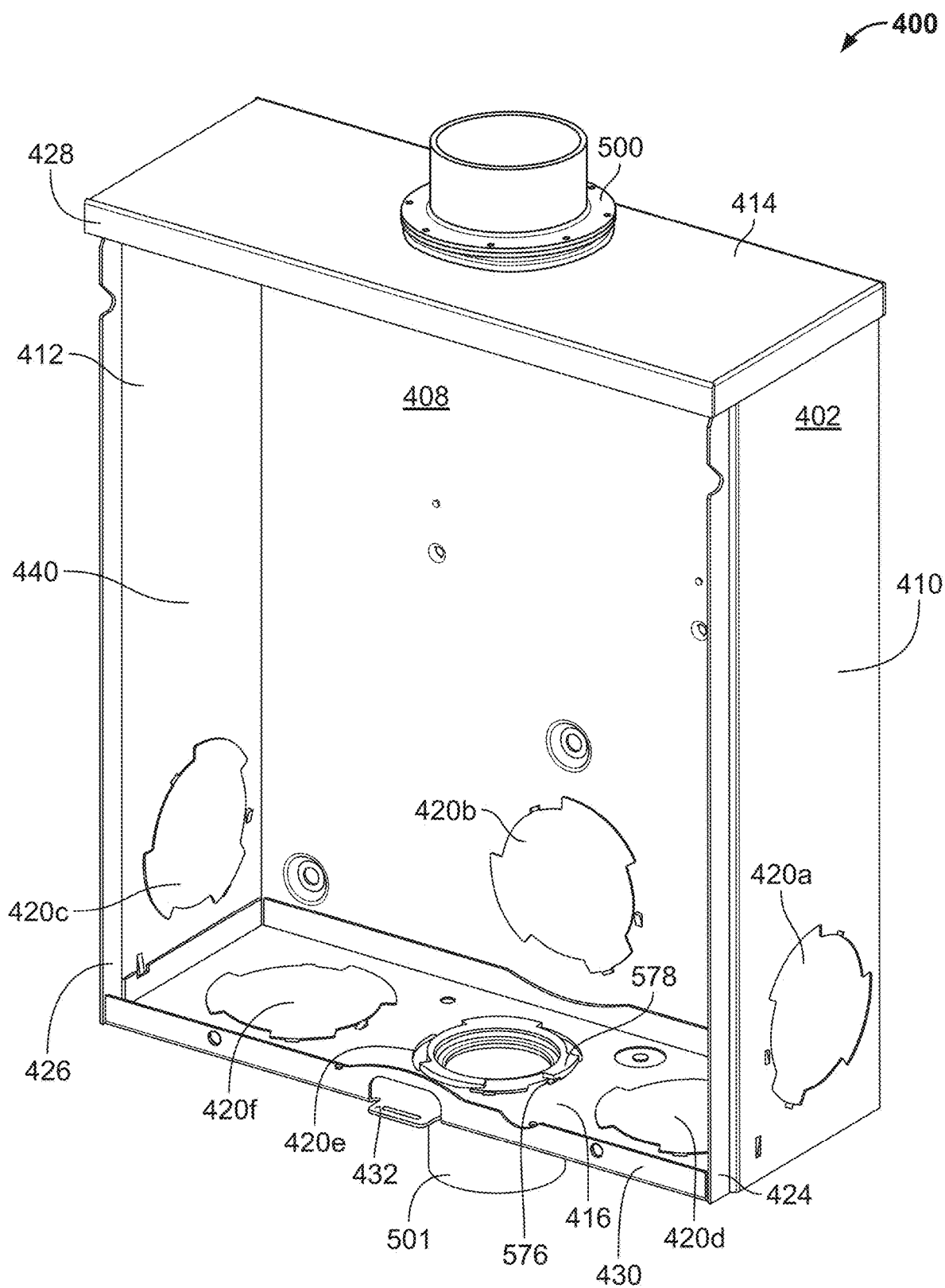
FIG. 15 is a perspective view of a meter socket enclosure with a conduit hub adapter secured to a top wall of the meter socket enclosure in accordance with an exemplary embodiment of the invention described herein.
Figure 16:
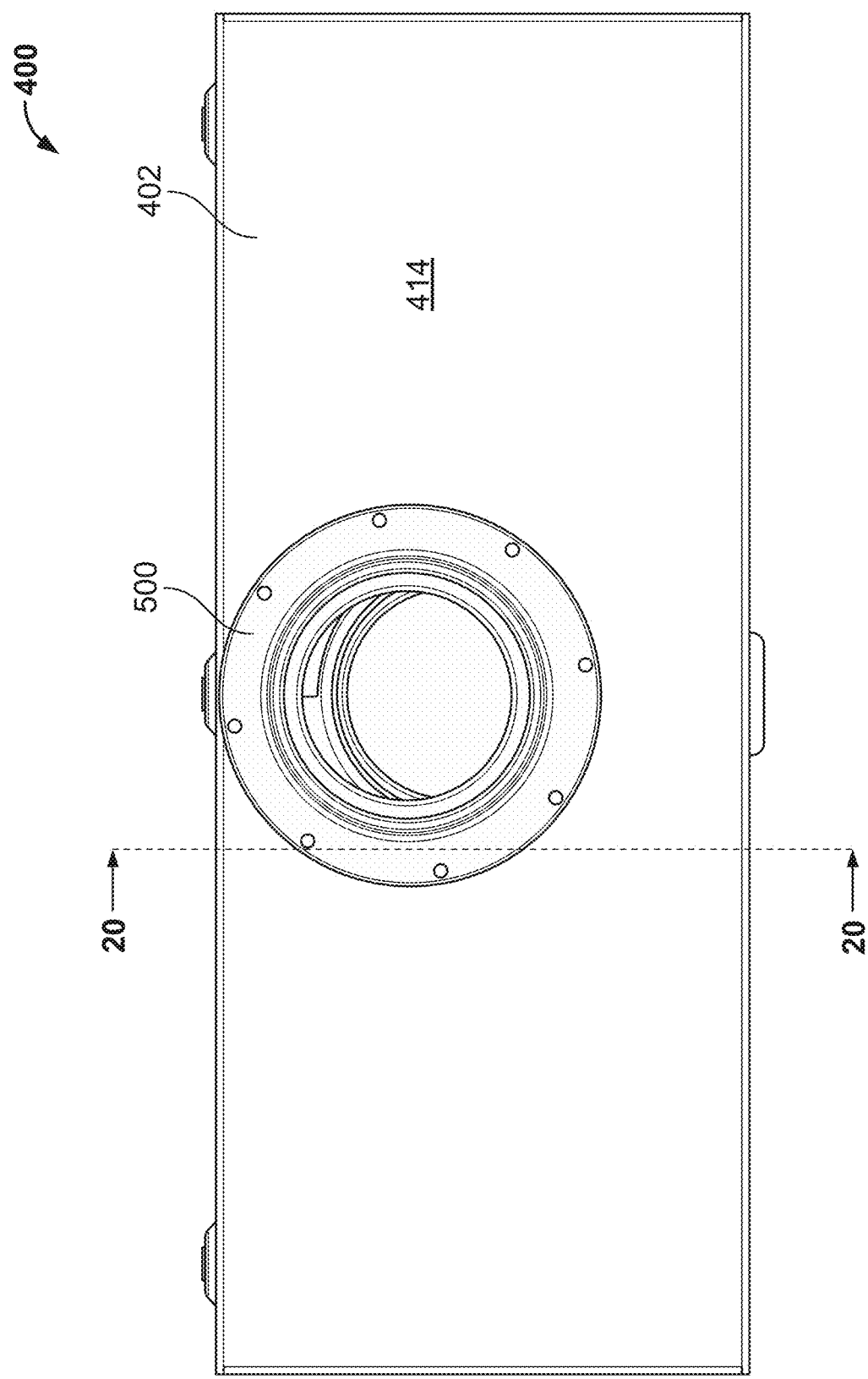
FIG. 16 is a top plan view of the meter socket enclosure shown in FIG. 15.

Referring to FIG. 15, each of the knockouts 420a-f is a panel that is removably connected to one of back wall 408, side wall 410, side wall 412, or bottom wall 416 to cover an opening in the respective wall. The knockouts 420a-f may be pressed or punched to expose the opening and allow an electrical power conductor to pass through the opening. The openings covered by knockouts 420a-f may have a shape that is substantially similar to opening 418 described above. The diameters of the openings covered by knockouts 420a-f may be substantially the same as the diameter of opening 418 or they may vary from the diameter of opening 418 and from each other. For example, opening 418 and any of the openings covered by knockouts 420a-f may have a diameter that is sized for use with any of the following diameters of electrical conduit that is joined to conduit hub adapter 500: 0.5", 0.75", 1", 1.25", 1.5", 2", 2.5", 3", 3.5", 4", 5", 6", 16 mm, 21 mm, 27 mm, 35 mm, 41 mm, 53 mm, 63 mm, 78 mm, 91 mm, 103 mm, 129 mm, and 155 mm. Each of the back wall 408, side wall 410, side wall 412, and bottom wall 416 further includes a retainer that is adjacent each of the knockouts 420a-f and that has a configuration that is substantially similar to retainer 438 described above.

4. Conduit Hub Adapter

One exemplary embodiment of conduit hub adapter 500 for use with the meter sockets 200, 300, and 400 is shown in FIGS. 23-27. Conduit hub adapter 500 allows an electrical conduit (not shown) to be connected to the meter sockets 200, 300, and 400 (and any other suitable electrical box) in a secure and water tight manner. Further, as described herein, conduit hub adapter 500 may be joined to the meter sockets 200, 300, and 400 quickly and without the use of tools or separate fasteners. Conduit hub adapter 500 has a base 502, a conduit connector 504 coupled to and extending outward from the base 502, and an enclosure engaging structure 506 (FIGS. 25-27) that is coupled to and extends outward from the base 502 in an opposite direction as the conduit connector 504.

Base 502 is annular and extends radially outward from the conduit connector 504 and the enclosure engaging structure 506. Holes, one of which is identified as 508, are formed in base 502 adjacent a peripheral edge. The holes receive plugs, one of which is identified as 510, of a seal 512 that is positioned adjacent a lower surface of the base 502. The seal 512 may be made from a resilient material that is suitable for sealingly engaging the raised embossment 434 of top wall 414 (FIGS. 21 and 22) when the conduit hub adapter 500 is coupled to the top wall 414. The base 502, conduit connector 504, and enclosure engaging structure 506 may be made from a rigid material. In one embodiment, the seal 512 may be molded in place with the base 502, conduit connector 504, and enclosure engaging structure 506. The seal 512 may alternatively be formed separate from the base 502 and coupled to the base in any manner. In addition, a seal 512 may not be provided on the base 502 and other structure(s) may be relied on to prevent water from entering the opening 418 in enclosure 402 (e.g., caulk may be applied between the base 502 and enclosure 402). The base 502, conduit connector 504, and enclosure engaging structure 506 may be formed from polyvinyl chloride (PVC) while the seal 512 is formed from any suitable type of elastomeric material. Further, the base 502, conduit connector 504, and enclosure engaging structure 506 may be formed from any suitable material, including a metal (e.g. aluminum, steel, stainless steel, zinc, magnesium, or combinations thereof) or a polymeric material (e.g. PVC, polycarbonate, a UL-approved plastic, or combinations thereof).

Conduit connector 504 extends outward from base 502 in a direction that is generally perpendicular to base 502. Conduit connector 504 is a generally cylindrical tube that is adapted for connection to an electrical conduit. Conduit connector 504 may have a threaded interior surface 514 or exterior surface 516 for connection to an electrical conduit having a threaded end. Conduit connector 504 may further have relatively smooth unthreaded interior and exterior surfaces for connection to an electrical conduit that does not have a threaded end. For example, if conduit connector 504 is formed from PVC, it may be joined to a PVC electrical conduit with PVC cement. A channel 518 extends through the conduit connector 504, base 502, and enclosure engaging structure 506. The channel 518 is at least partially aligned with the opening 418 in the enclosure 402 when the conduit hub adapter 500 is coupled to the top wall 414. This allows an electrical power conductor to pass through an electrical conduit joined to conduit hub adapter 500, the channel 518 of conduit hub adapter 500, and opening 418 into the interior space 440 of enclosure 402.

Referring to FIGS. 24-27, enclosure engaging structure 506 includes a side wall 520 and three keys (a first key 522, a second key 524, and a third key 526) that each extend radially outward from the side wall 520. Side wall 520 extends outward from base 502 in a direction that is generally perpendicular to base 502 and opposite to the direction that conduit connector 504 extends from base 502. In an alternate configuration, the keys 522, 524, 526 may extend radially inward from the side wall if, for example, the keyed sections 442, 444, 446 extend radially inward from curved sections 448a-c.

Figure 25:
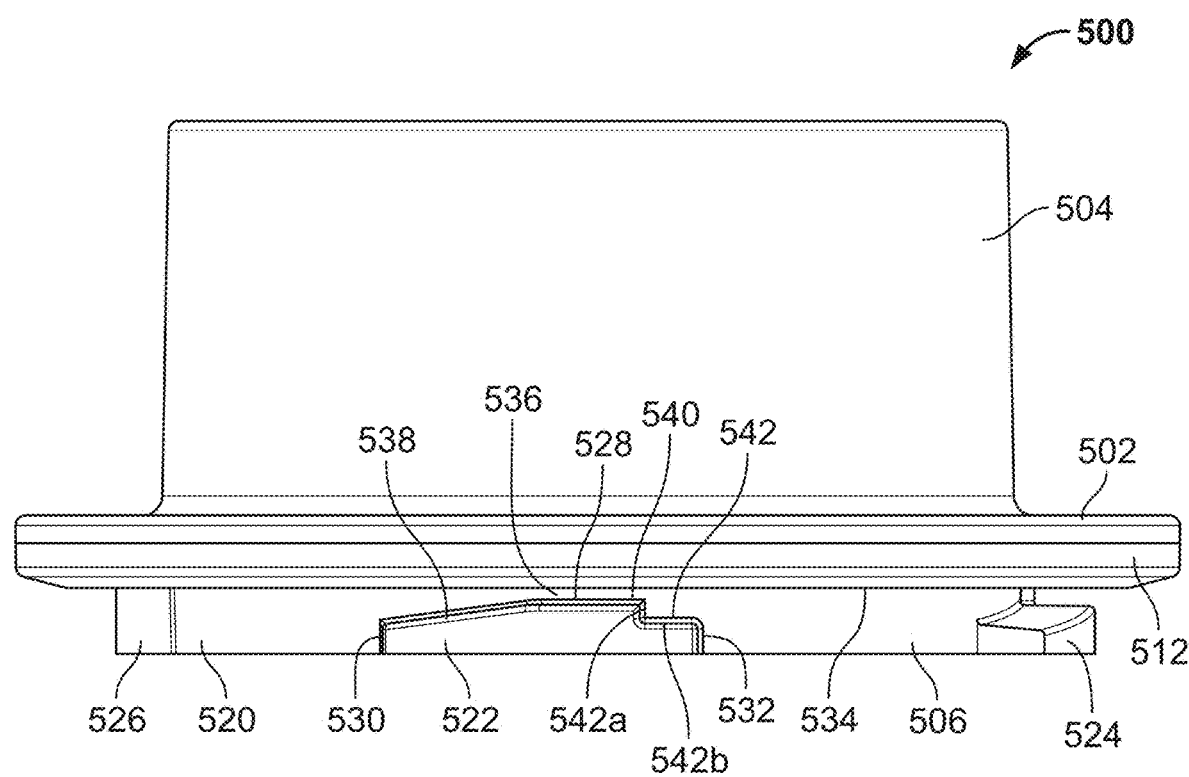
FIG. 25 is a side elevational view of the conduit hub adapter shown in FIG. 23 showing a first key.

The first key 522, shown in FIG. 25, has an upper surface 528, a leading edge 530, and a trailing edge 532. The upper surface 528 is spaced apart from a lower surface 534 of the base 502 to define a gap 536 between the first key 522 and the base 502. The upper surface 528 includes a sloped surface 538 that slopes upward toward the base 502 as it extends from the leading edge 530 toward the trailing edge 532. The upper surface 528 further includes a planar surface 540 that extends from the sloped surface 538 toward the trailing edge 532. The planar surface 540 is generally parallel and spaced apart from the lower surface 534 of the base 502. A notch 542 is formed in the upper surface 528 between the planar surface 540 and the trailing edge 532. The notch 542 is defined by a first surface 542a extending generally perpendicular to planar surface 540 in a direction away from base 502 and a second surface 542b extending generally perpendicular to first surface 542a in a direction toward trailing edge 532.

Figure 26:
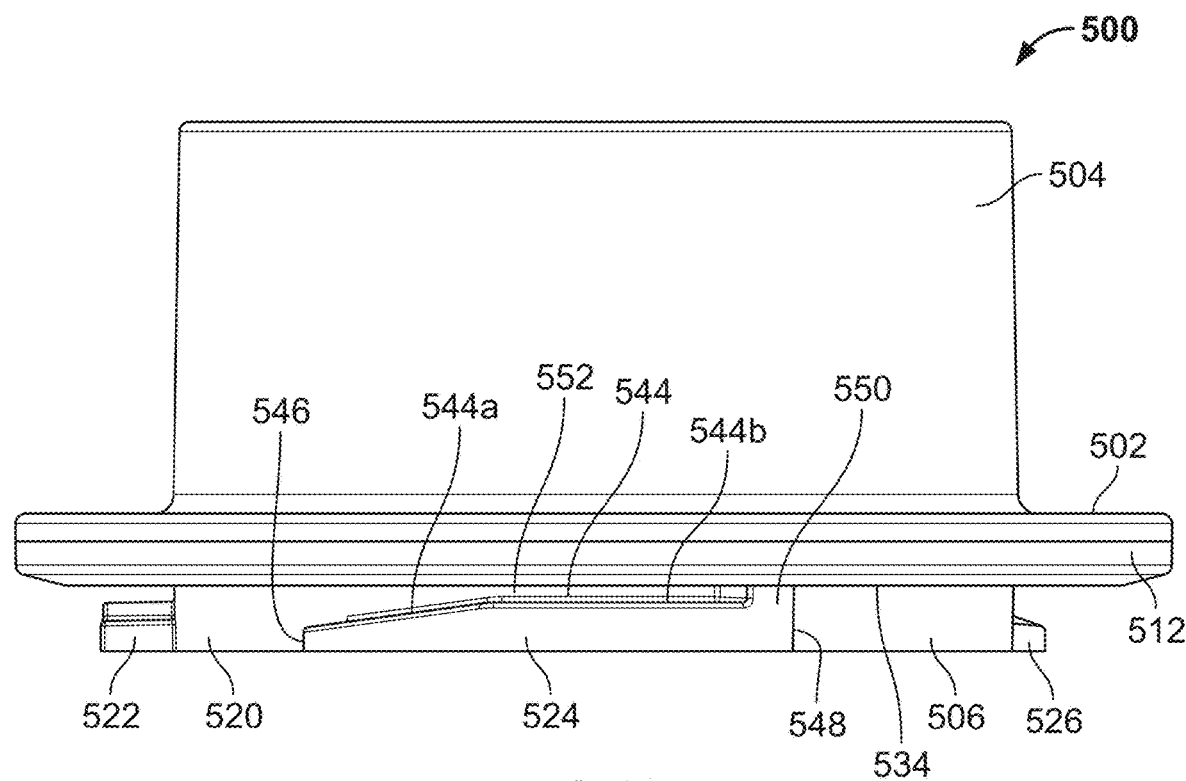
FIG. 26 is a side elevational view of the conduit hub adapter that is rotated approximately 120 degrees from the view shown in FIG. 25 showing a second key.

The second key 524, shown in FIG. 26, has an upper surface 544, a leading edge 546, and a trailing edge 548. A stop 550 adjacent the trailing edge 548 extends from the upper surface 544 of the second key 524 to the lower surface 534 of the base 502. The upper surface 544 includes a sloped surface 544a that slopes upward toward the base 502 as it extends from the leading edge 546 toward the trailing edge 548. The upper surface 544 further includes a planar surface 544b that extends from the sloped surface 544a to the stop 550. The planar surface 544b is generally parallel and spaced apart from the lower surface 534 of the base 502. The upper surface 544 is spaced apart from the lower surface 534 of the base 502 to define a gap 552 between the second key 524 and the base 502.

Figure 27:
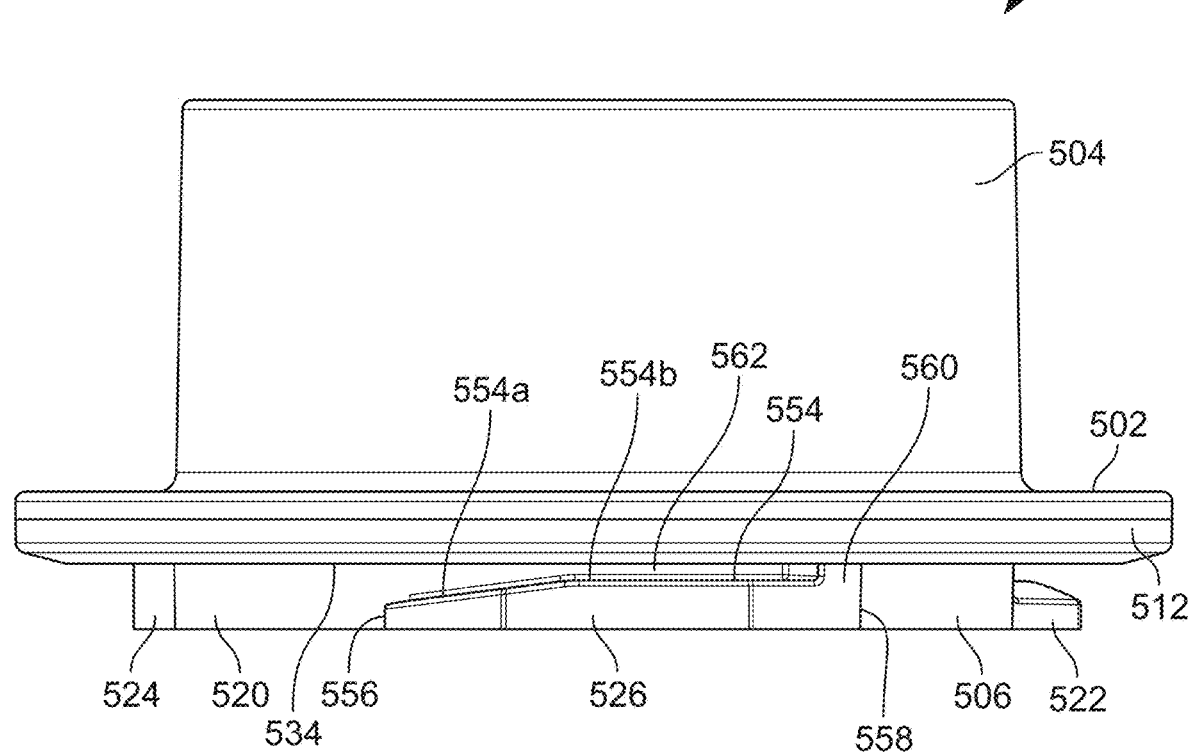
FIG. 27 is a side elevational view of the conduit hub adapter that is rotated approximately 120 degrees from the view shown in FIG. 26 showing a third key.

The third key 526, shown in FIG. 27, has an upper surface 554, a leading edge 556, and a trailing edge 558. A stop 560 adjacent the trailing edge 558 extends from the upper surface 554 of the third key 526 to the lower surface 534 of the base 502. The upper surface 554 includes a sloped surface 554a that slopes upward toward the base 502 as it extends from the leading edge 556 toward the trailing edge 558. The upper surface 554 further includes a planar surface 554b that extends from the sloped surface 554a to the stop 560. The planar surface 554b is generally parallel and spaced apart from the lower surface 534 of the base 502. The upper surface 554 is spaced apart from the lower surface 534 of the base 502 to define a gap 562 between the third key 526 and the base 502.

Figure 24:
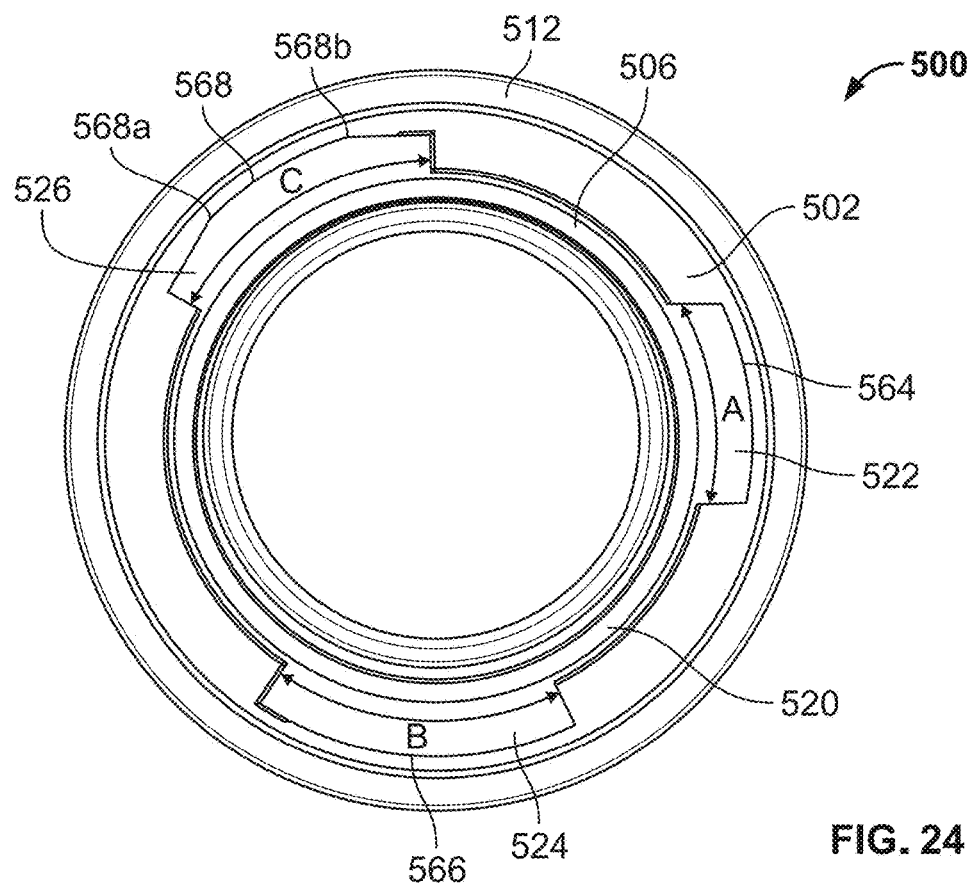
FIG. 24 is a bottom plan view of the conduit hub adapter shown in FIG. 23.

Referring to FIG. 24, first, second, and third keys 522, 524, and 526 are spaced approximately equidistant from each other around a circumference of side wall 520. The first, second, and third keys 522, 524, and 526 are spaced approximately 120 degrees from each other around side wall 520.

The first key 522 is sized and shaped to generally match the first keyed section 442 shown in FIG. 21 such that the first key 522 may be inserted through the opening 418 adjacent the first keyed section 442. Likewise, the second key 524 is sized and shaped to generally match the second keyed section 444 such that the second key 524 may be inserted through the opening 418 adjacent the second keyed section 444, and the third key 526 is sized and shaped to generally match the third keyed section 446 such that the third key 526 may be inserted through the opening 418 adjacent the third keyed section 446.

The first, second, and third keys 522, 524, and 526 have different shapes that generally match the first, second, and third keyed sections 442, 444, and 446, respectively, shown in FIG. 21. The first key 522 extends a circumferential distance A around side wall 520 that is less than a circumferential distance B of second key 524 and a circumferential distance C of third key 526. Further, while both first key 522 and second key 524 have outer walls 564 and 566, respectively, that are curved around the central axis of opening 418, third key 526 has an outer wall 568 that includes three sections with sharp edges 568a and 568b between adjacent sections. These differences between the shapes of first, second, and third keys 522, 524, and 526, and the respective shapes of first, second, and third keyed sections 442, 444, and 446 ensure that first, second, and third keys 522, 524, and 526 may only be inserted through opening 418 in a single orientation (i.e., an orientation in which first key 522 is adjacent first keyed section 442, second key 524 is adjacent second keyed section 444, and third key 526 is adjacent third keyed section 446). Ensuring that conduit hub adapter 500 may only be joined to enclosure 402 in a single orientation ensures that the conduit hub adapter 500 is correctly aligned with the back wall 408 for correct electrical conduit alignment. Although conduit hub adapter 500 is shown with three keys, it may have any number of keys.

Figure 18:
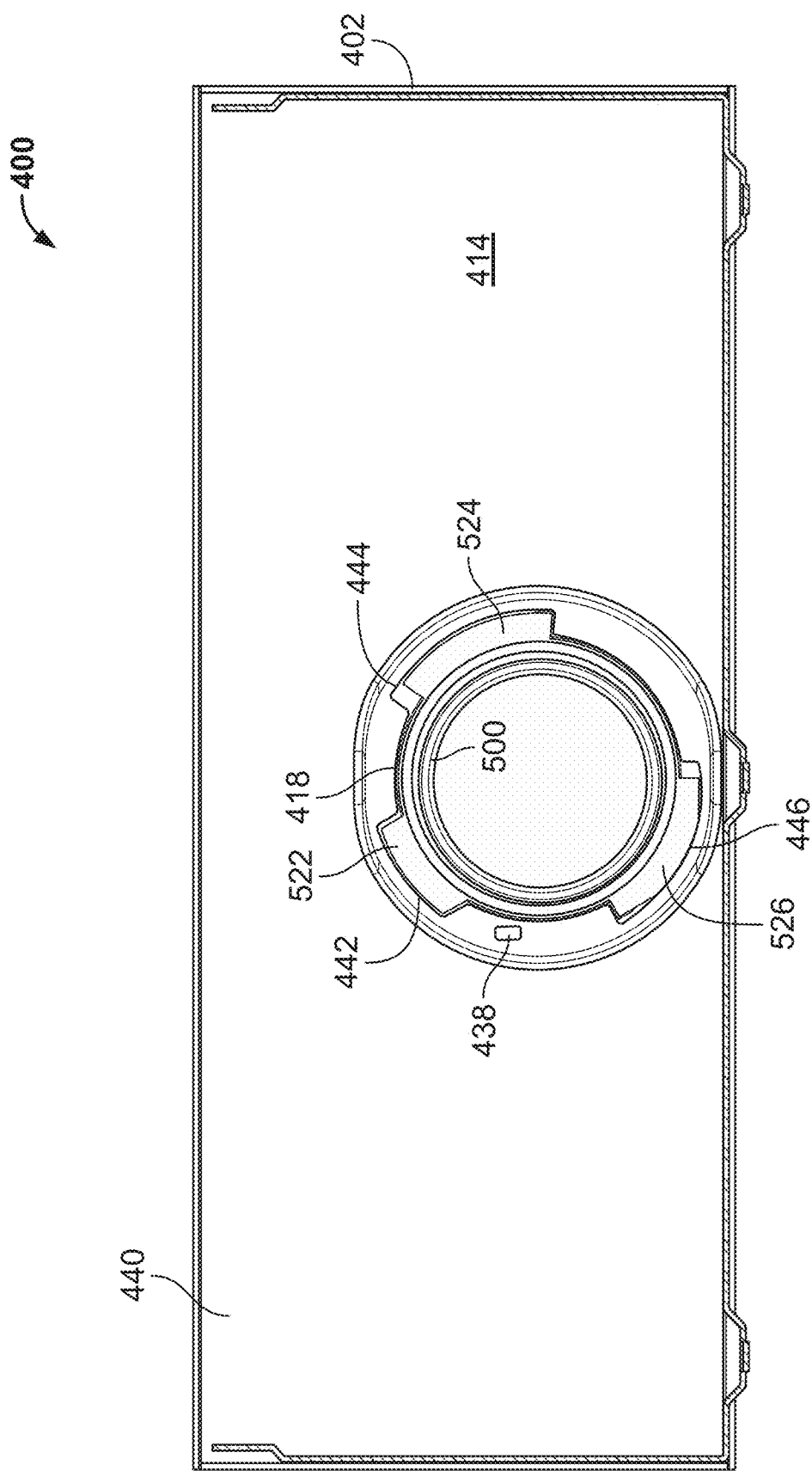
FIG. 18 is a cross-sectional view taken through the line 18-18 shown in FIG. 17 with the conduit hub adapter shown in a disengaged position.

FIG. 18 is a view from inside the enclosure 402 looking up at the opening 418 and showing the first, second, and third keys 522, 524, and 526 inserted through the opening 418 and into the interior space 440 of the enclosure 402. The conduit hub adapter 500 is in a disengaged position when the first, second, and third keys 522, 524, and 526 are in the position shown in FIG. 18 because the conduit hub adapter 500 may be lifted vertically to remove the keys from the interior space 440.

Figure 19:
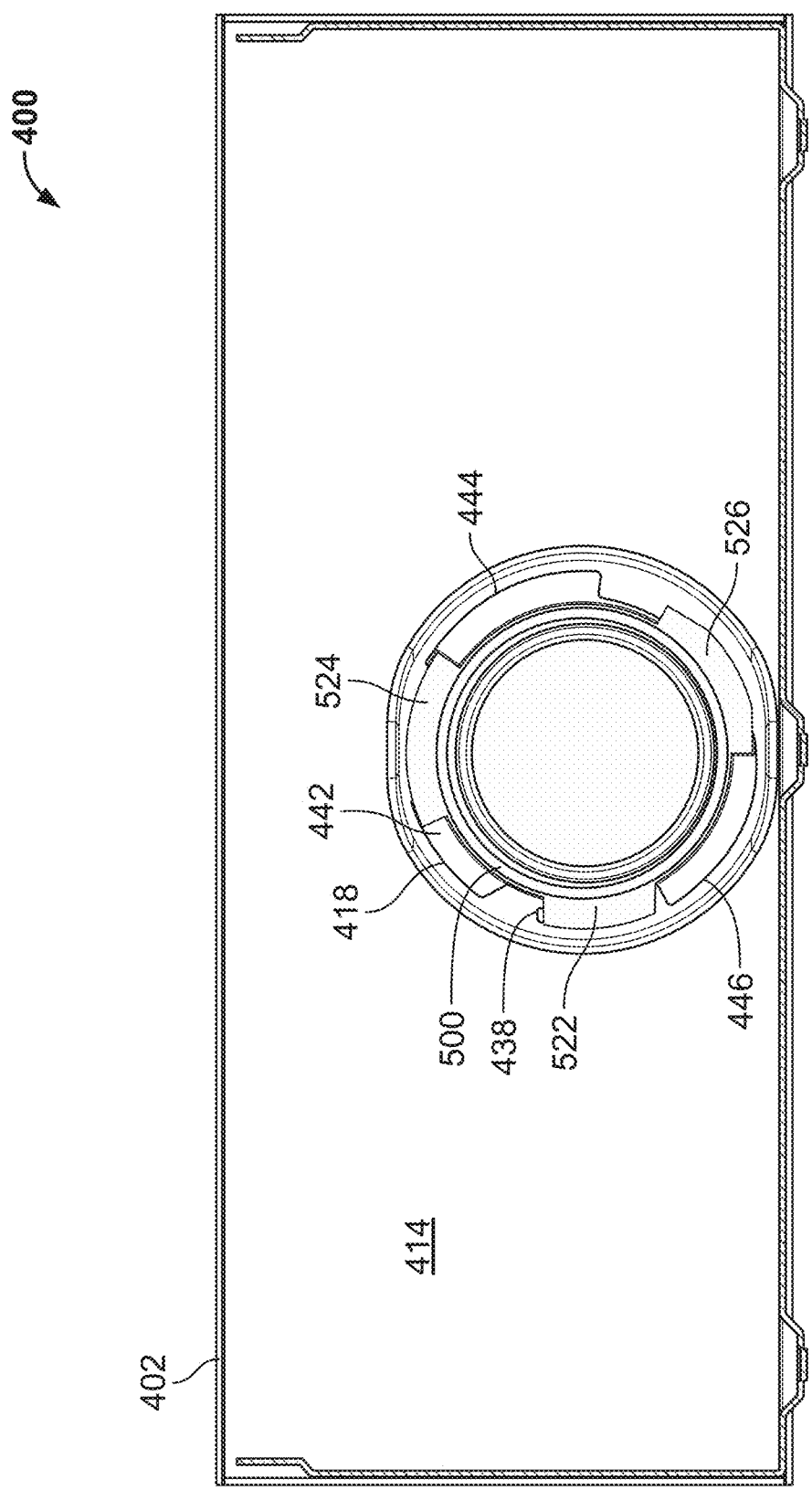
FIG. 19 is a cross-sectional view taken through the line 18-18 shown in FIG. 17 with the conduit hub adapter shown in an engaged position.

The conduit hub adapter 500 is rotatable from the disengaged position shown in FIG. 18 to an engaged position shown in FIG. 19 by rotating the conduit hub adapter 500 approximately 60 degrees in a counter-clockwise direction when viewed as shown in FIGS. 18 and 19. In the engaged position, the conduit hub adapter 500 is secured to the enclosure 402 to generally prevent rotation (in both the clockwise and counter-clockwise directions) and prevent movement in a direction aligned with a central axis of opening 418. As the conduit hub adapter 500 rotates from the disengaged position to the engaged position, the retainer 438 slidingly engages the sloped surface 538 and planar surface 540 of the first key 522. When the conduit hub adapter 500 reaches the engaged position, the retainer 438 extends downward into the notch 542 of first key 522, as shown in FIG. 20. The retainer 438 secures the conduit hub adapter 500 to the enclosure 402 by preventing the conduit hub adapter 500 from rotating back from the engaged position to the disengaged position. Further, the stops 550 and 560 on second and third keys 524 and 526, respectively, engage edges 570 and 572 (FIG. 21), respectively, of top wall 414 to prevent further rotation of conduit hub adapter 500 from the engaged position in the counter-clockwise direction when viewed as shown in FIG. 19.

As shown in FIG. 20, when the conduit hub adapter 500 is in the engaged position, the upper surface 436 of raised embossment 434 is positioned in the gap 536 between the first key 522 and the base 502. The upper surface 436 of raised embossment 434 is also positioned in the gaps 552 and 562 between the second and third keys 524 and 526, respectively, and the base 502. A lower surface of the seal 512 sealingly engages the upper surface 436 of raised embossment 434. The gaps 536, 552, and 562 may be sized so that when the conduit hub adapter 500 is in the engaged position, the seal 512 is slightly compressed between the base 502 and the upper surface 436 of raised embossment 434 to facilitate sealing. The sealing engagement between seal 512 and enclosure 402 is preferably compliant with a NEMA 3R enclosure rating. With the upper surface 436 positioned between the first, second, and third keys 522, 524, and 526 and the base 502, the conduit hub adapter 500 is substantially constrained from moving in a direction that is parallel to a central axis of the opening 418. For example, the seal 512 engages the upper surface 436 of raised embossment 434 to substantially prevent movement of conduit hub adapter 500 in a direction toward the interior space 440 of enclosure 402. Further, the upper surfaces 528, 544, and 554 of keys 522, 524, and 526 engage a lower surface 574 of raised embossment 434 to substantially prevent movement of conduit hub adapter 500 in a direction away from the interior space 440 of enclosure 402.

When the conduit hub adapter 500 is in the engaged position shown in FIG. 20, the retainer 438 may only be disengaged from the conduit hub adapter 500 from within the interior space 440. To disengage the retainer 438 from the conduit hub adapter 500, a tool (e.g., a screwdriver or wedge) must be placed between the retainer 438 and the first key 522. Because the retainer 438 engages the first key 522 within the interior space 440, access to the interior space 440 is needed to place the tool between the retainer 438 and first key 522. With the tool in place, the retainer 438 and first key 522 must be forced away from each in a direction that is parallel to the central axis of opening 418 until the retainer 438 clears the upper surface 528 of first key 522. Once retainer 438 clears the upper surface 528 of first key 522, first key 522 may be rotated back from the engaged position to the disengaged position shown in FIG. 18. Permanent or plastic deformation of the retainer 438 and/or the first key 522 may be required in order to disengage the retainer 438 from the conduit hub adapter 500 and move the conduit hub adapter 500 back to the disengaged position.

Requiring access to the interior space 440 to disengage the retainer 438 from the conduit hub adapter 500 increases the security of electrical box 400 by preventing unauthorized access to the interior space 440 through the opening 418. When conduit hub adapter 500 is mounted to top wall 414 and an electrical conduit is joined to conduit hub adapter 500, access to interior space 440 through opening 418 is generally prevented. Thus, by ensuring that conduit hub adapter 500 remains engaged to top wall 414, unauthorized access through opening 418 is prevented. Only authorized personnel with the correct tool to remove the cover from electrical box 400, as described in more detail above with respect to meter socket 200, would be able to access the interior space 440 and remove the conduit hub adapter 500 from the enclosure 402.

Figure 17:
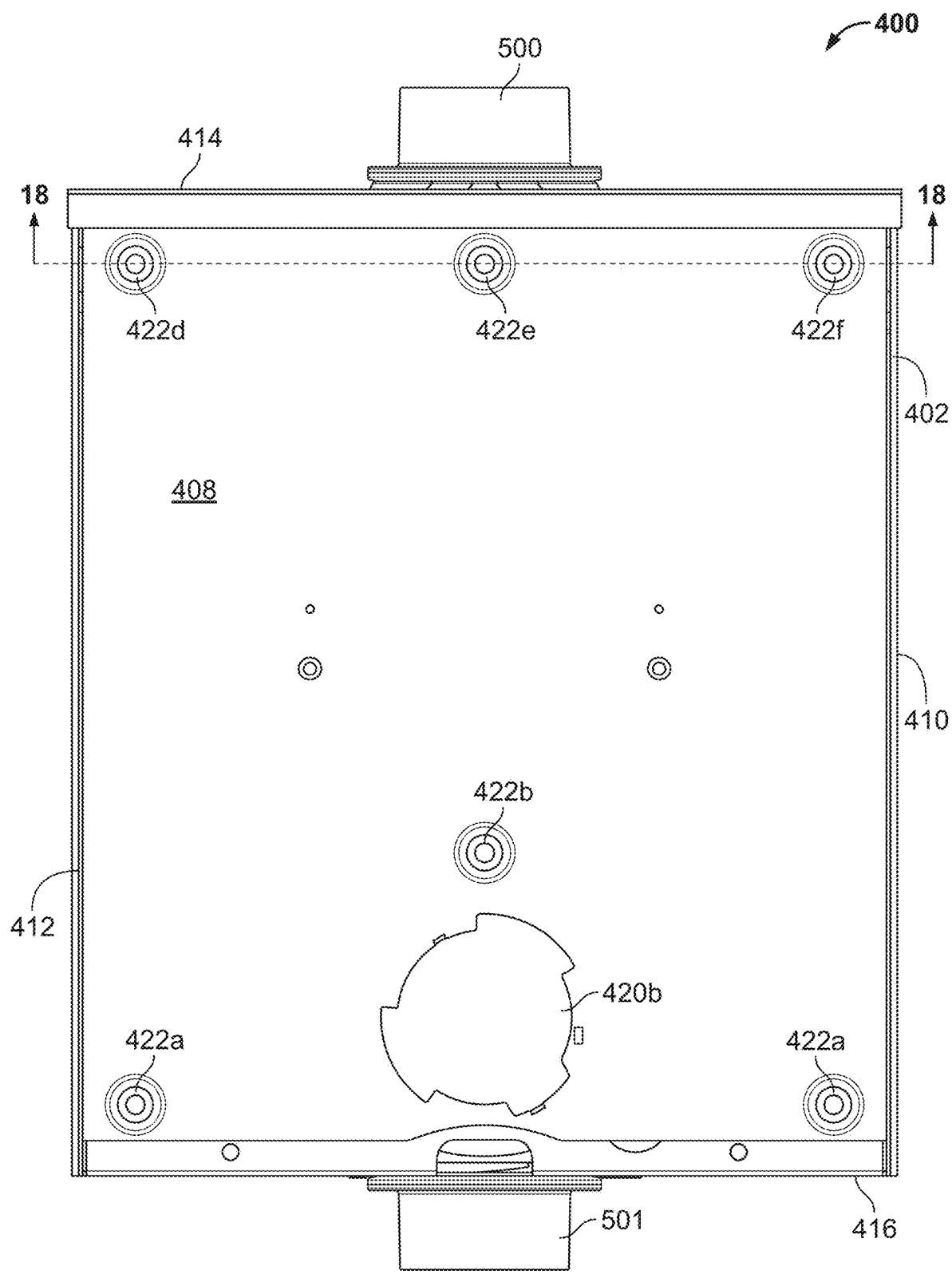
FIG. 17 is a front elevational view of the meter socket enclosure shown in FIG. 15.

FIGS. 15 and 17 show a second conduit hub adapter 501 that is mounted to bottom wall 416 of enclosure 402. Second conduit hub adapter 501 is substantially the same as the conduit hub adapter 500 described above and shown in FIGS. 23-27. Accordingly, second conduit hub adapter 501 is not described in detail herein. Second conduit hub adapter 501 mounts to the bottom wall 416 of enclosure in substantially the same manner as described above with respect to conduit hub adapter 500 and top wall 414. Thus, second conduit hub adapter 501 is movable from a disengaged position to an engaged position, in which a retainer 576 of enclosure 402 engages a key 578 of second conduit hub adapter 501 to secure the second conduit hub adapter 501 to the enclosure 402. Whereas conduit hub adapter 500 may be joined to an electrical conduit that houses an electrical power conductor that enters enclosure 402 from an electric power utility, second conduit hub adapter 501 may be joined to an electrical conduit that houses an electrical power conductor that exits enclosure 402 for routing to a customer premises. One or more additional conduit hub adapters (not shown), like conduit hub adapters 500 and 501, may be joined to enclosure 402 by removing one or more of knockouts 420*a-d* and 420*f*. The additional conduit hub adapters may be used to route additional electrical conductors in to or out of enclosure 402.

Figure 28:
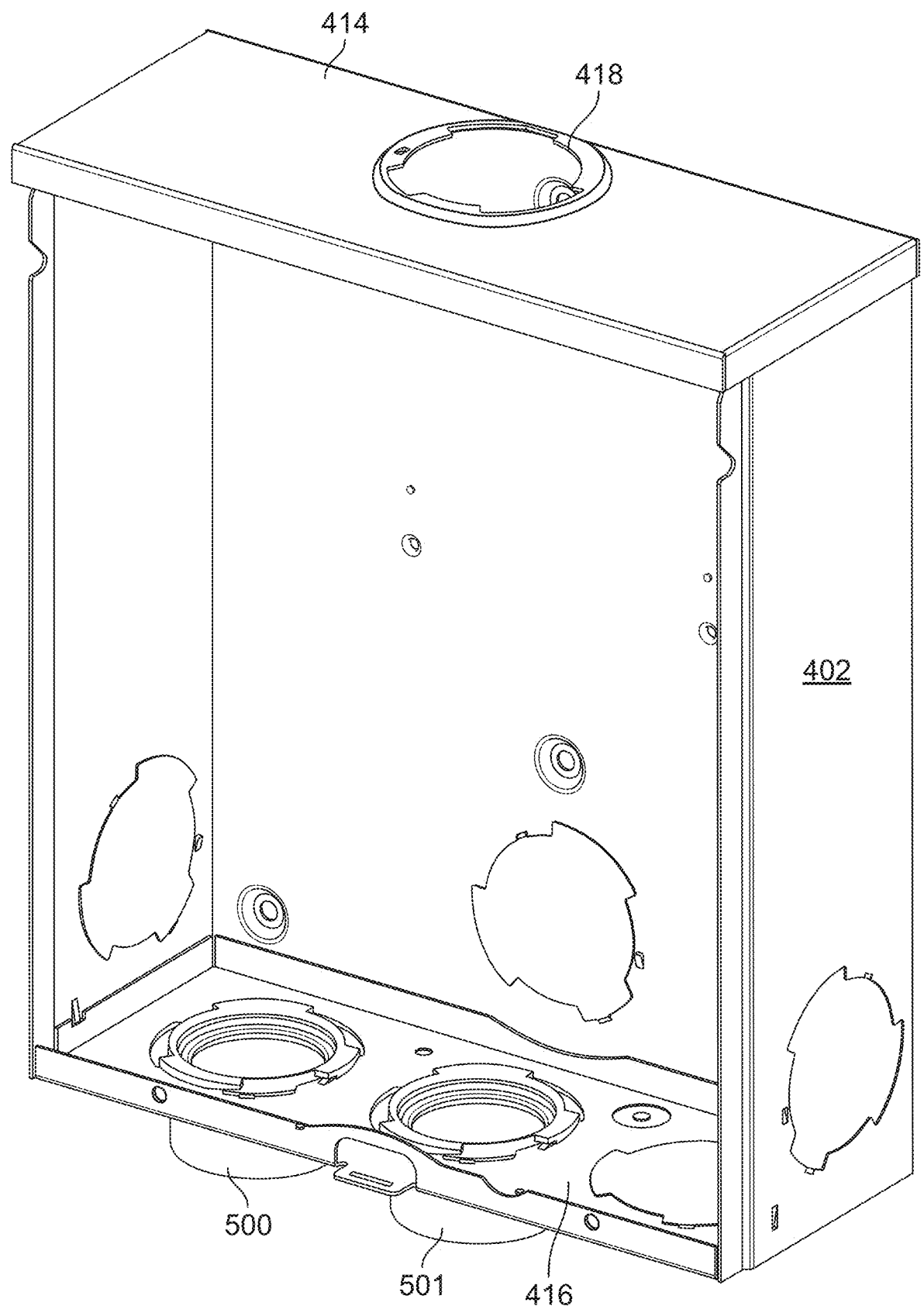
FIG. 28 is a perspective view of the meter socket enclosure shown in FIG. 15 with two conduit hub adapters secured to a bottom wall of the meter socket enclosure in accordance with another exemplary embodiment of the invention described herein.

FIG. 28 shows enclosure 402 with knockout 420*f* (FIG. 15) removed and conduit hub adapter 500 joined to bottom wall 416 adjacent the opening uncovered by the removal of knockout 420*f*. Conduit hub adapter 500 mounts to bottom wall 416 in substantially the same manner as described above with respect to mounting conduit hub adapter 500 to top wall 414. Second conduit hub adapter 501 is also mounted to bottom wall 416 adjacent conduit hub adapter 500. A cover (not shown) may be used to cover the opening 418 in top wall 414 when conduit hub adapter 500 is mounted to bottom wall 416. Enclosure 402 may be used in this configuration when the electrical power conductor from the electric power utility and the electrical power conductor routed to the customer premises are both positioned beneath the enclosure 402. The conduit hub adapters 500 and 501 may be joined to openings uncovered when any of the knockouts 420*a-f* are removed.

Although conduit hub adapters 500 and 501 are described herein and shown in the drawings as being used with meter socket enclosure 402, conduit hub adapters 500 and 501 may be used with any suitable electrical box having openings, similar to opening 418, that are configured for use with conduit hub adapters 500 and 501.

5. Alternative Conduit Hub Adapters

Figure 29:
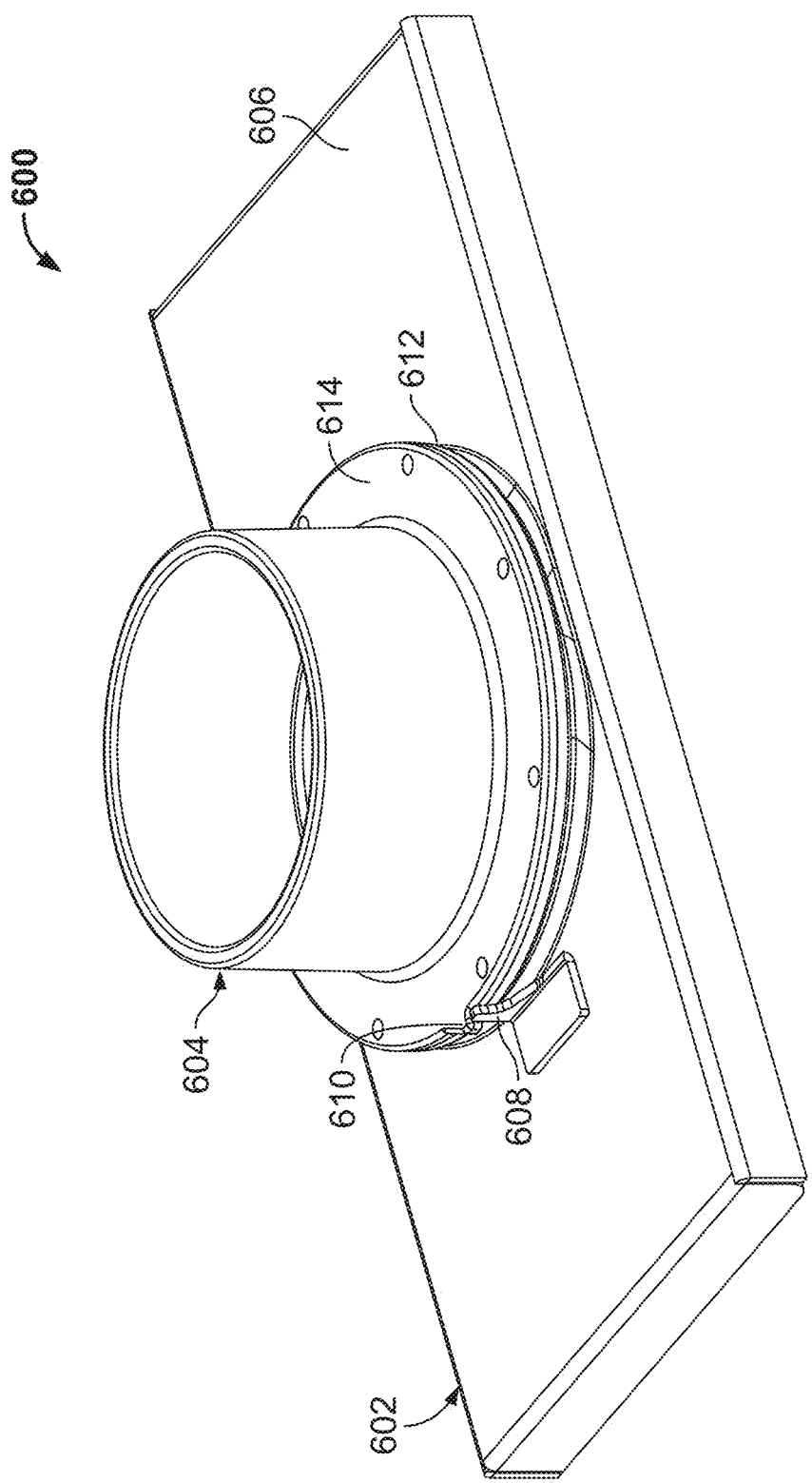
FIG. 29 is a perspective view of an alternative embodiment of conduit hub adapter secured to an electrical box in accordance with another aspect of the invention described herein.
Figure 30:
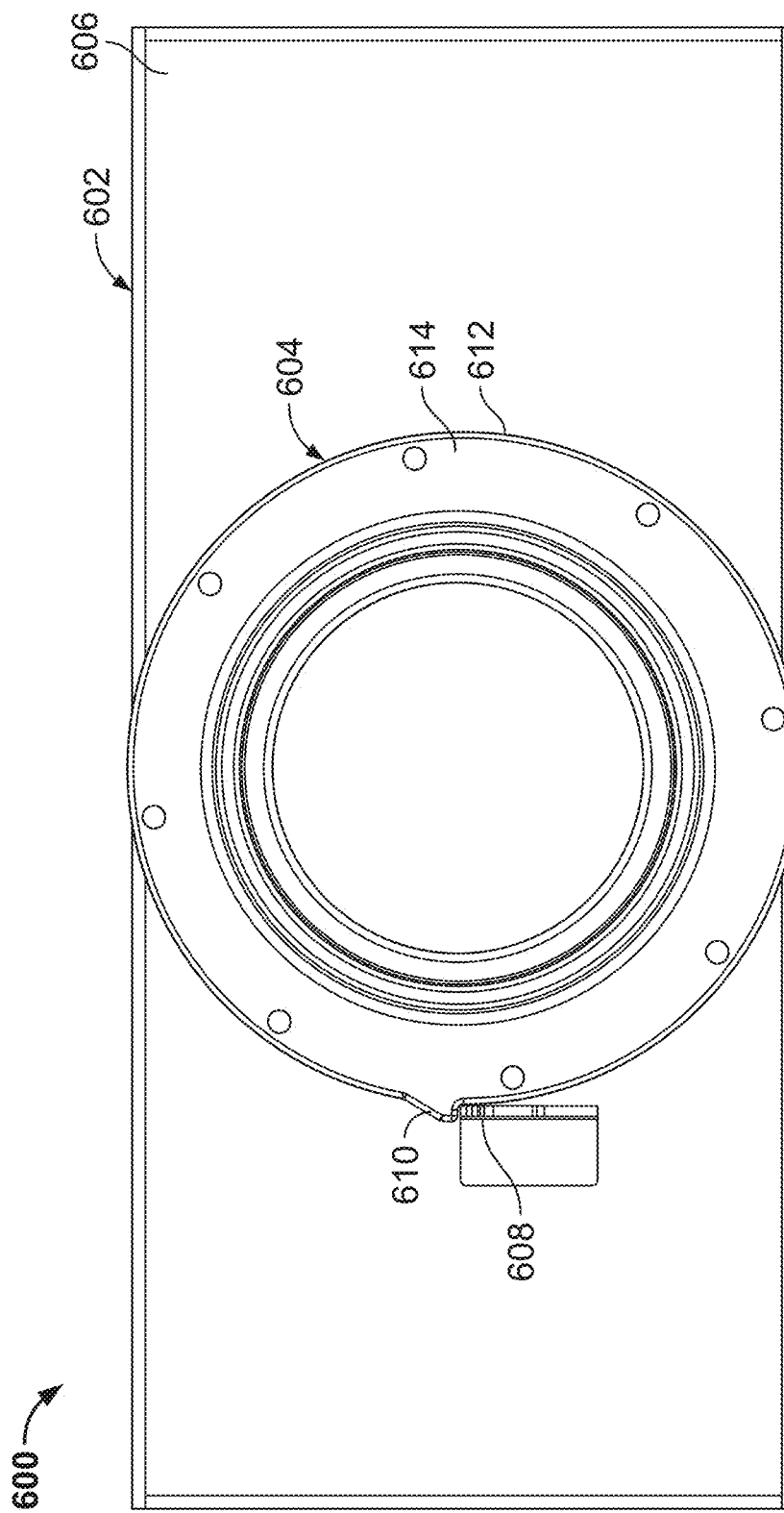
FIG. 30 is a top plan view of the conduit hub adapter shown in FIG. 29.
Figure 31:
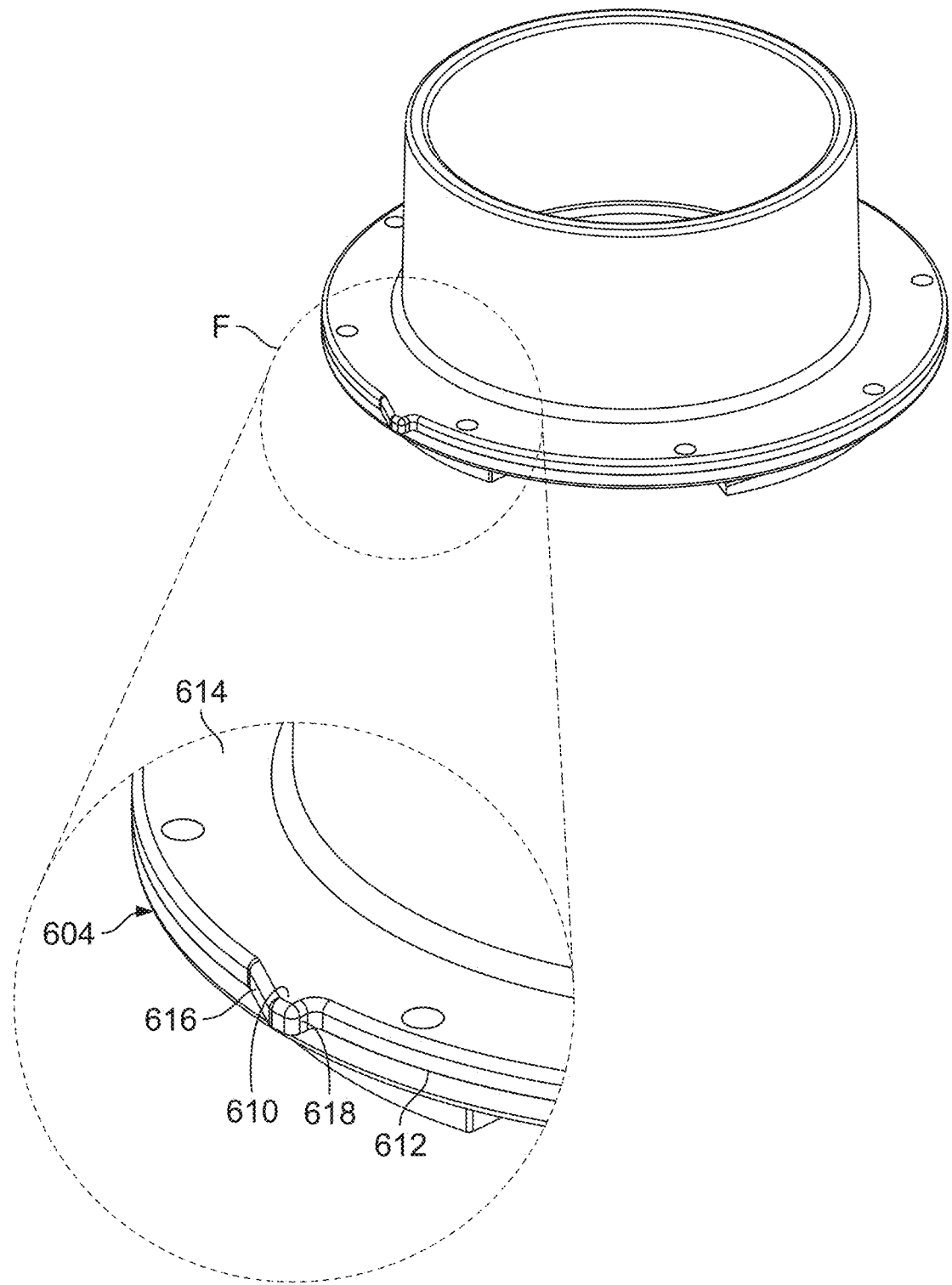
FIG. 31 is a detail view of a tooth of the conduit hub adapter shown in FIG. 29.

FIGS. 29-30 show an electrical box 600 having an enclosure 602 and a conduit hub adapter 604, which is configured for securing to the enclosure 602. Enclosure 602 may be any type of electrical box enclosure. While only a single wall 606 of enclosure 602 is shown in the drawings, enclosure 602 may have additional walls that are substantially similar to the walls of enclosures 202, 302, and 402. Enclosure 602 and conduit hub adapter 604 are substantially similar to enclosure 402 and conduit hub adapter 500 described above except that enclosure 602 has a retainer 608 that engages conduit hub adapter 604 outside of an interior space (not shown) defined by the enclosure 602. The interior space of enclosure 602 is positioned beneath the wall 606 shown in FIG. 29. The conduit hub adapter 604 has a tooth 610 that extends radially outward from a peripheral edge 612 of a base 614. Referring to FIG. 31, the tooth 610 includes a sloped surface 616 that extends outward from peripheral edge 612 and a locking surface 618 that extends from the sloped surface 616 to peripheral edge 612 in a direction that is generally perpendicular to a tangent of peripheral edge 612. The retainer 608 extends outward from wall 606 in a direction that is generally perpendicular to the wall 606.

Conduit hub adapter 604 rotates with respect to enclosure 602 between a disengaged position (not shown) and an engaged position, shown in FIGS. 29 and 30. Like conduit hub adapter 500, conduit hub adapter 604 includes keys (not shown) that engage wall 606 to generally prevent movement of conduit hub adapter 604 in a direction that is perpendicular to wall 606 when conduit hub adapter 604 is in the engaged position. As conduit hub adapter 604 rotates from the disengaged position to the engaged position, the sloped surface 616 of tooth 610 engages and slides past retainer 608. Conduit hub adapter 604 rotates in a clockwise direction, when viewed as shown in FIG. 30, from the disengaged position to the engaged position. When conduit hub adapter 604 reaches the engaged position shown in FIGS. 29 and 30, the locking surface 618 engages retainer 608 to prevent conduit hub adapter 604 from rotating back in a counter-clockwise direction to the disengaged position. The conduit hub adapter 604 may engage the enclosure 602 to prevent further rotation in the clockwise direction in the same manner described above with respect to conduit hub adapter 500.

When conduit hub adapter 604 is in the engaged position, retainer 608 and tooth 610 must be forced away from each other in order to rotate conduit hub adapter 604 back to the disengaged position and to remove conduit hub adapter 604 from engagement with enclosure 602. A cover (not shown) may be joined to at least one of conduit hub adapter 604 or enclosure 602 to cover retainer 608 and tooth 610 when conduit hub adapter 604 is in the engaged position. The cover may be lockable to the conduit hub adapter 604 and/or enclosure 602 in order to prevent an unauthorized person from disengaging tooth 610 from retainer 608 and removing conduit hub adapter 604 from enclosure 602.

Figure 32:
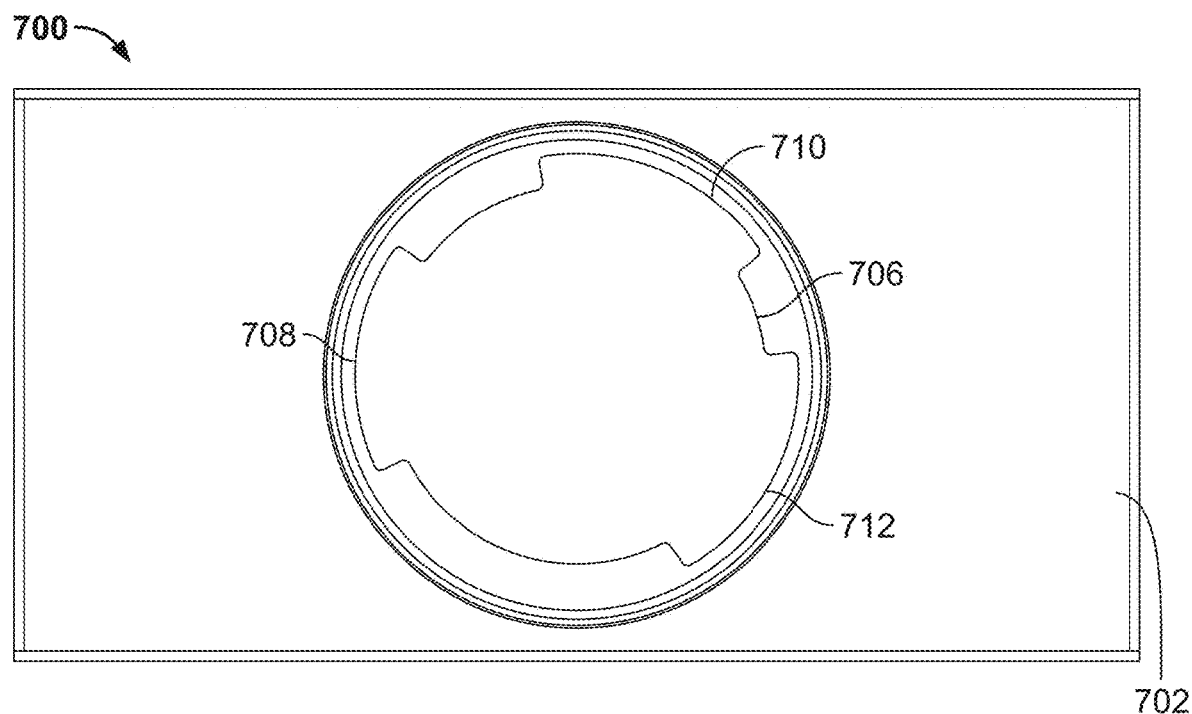
FIG. 32 is a top plan view of an alternative embodiment of electrical box in accordance with the invention described herein.
Figure 33:
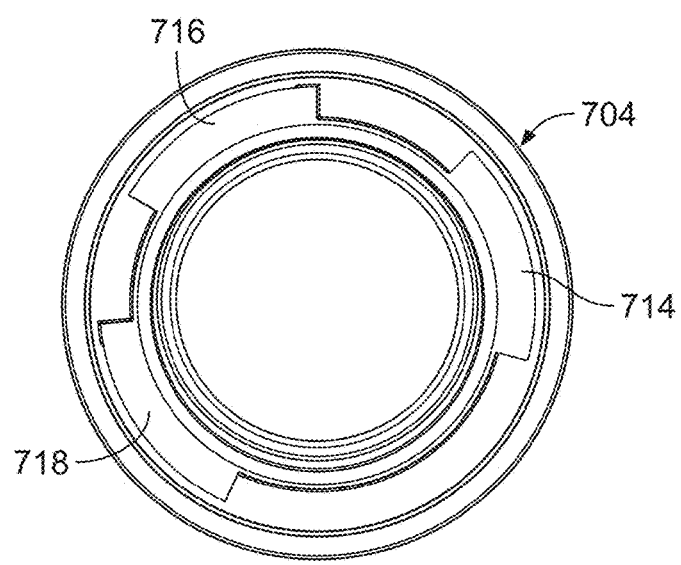
FIG. 33 is a bottom plan view of a conduit hub adapter configured for use with the electrical box shown in FIG. 32.

FIGS. 32 and 33 show another alternative electrical box 700 having an enclosure 702, shown in FIG. 32, and a conduit hub adapter 704, shown in FIG. 33. Enclosure 702 is substantially similar to the enclosure 402 described above except that enclosure 702 has an opening 706 surrounded by keyed sections 708, 710, and 712 each having substantially the same shape. The keyed sections 708, 710, and 712 are spaced apart from each other in a non-uniform manner such that a first distance between adjacent keyed sections 708, 710 is different than a second distance between adjacent keyed sections 710, 712. A third distance between adjacent keyed sections 712, 708 is also different than the first and second distances.

Conduit hub adapter 704 is substantially similar to the conduit hub adapter 500 described above except for the shapes and spacing of keys 714, 716, 718. Keys 714, 716, and 718 are shaped and spaced apart from each other to match the keyed sections 708, 710, and 712. For example, key 714 is insertable through opening 706 adjacent keyed section 708, key 716 is insertable through opening 706 adjacent keyed section 710, and key 718 is insertable through opening 706 adjacent keyed section 712.

The non-uniform spacing between keyed sections 708, 710, 712 and between keys 714, 716, 718 ensure that the keys 714, 716, 718 may only be inserted through opening 706 in a single orientation (i.e., an orientation in which key 714 is adjacent keyed section 708, key 716 is adjacent keyed section 710, and key 718 is adjacent keyed section 712). Ensuring that conduit hub adapter 704 may only be joined to enclosure 702 in a single orientation ensures that the conduit hub adapter 704 is correctly aligned with respect to the enclosure 702 in a desired orientation.

Once the keys 714, 716, and 718 are inserted through opening 706, conduit hub adapter 704 may be rotated from the disengaged position to the engaged position in substantially the same manner as described above with respect to conduit hub adapter 500.

Although conduit hub adapter 704 is shown having three keys 714, 716, 718 with non-uniform spacing between all of the adjacent keys 714, 716, 718, conduit hub adapter 704 may have any number of keys, and so long as the spacing between one pair of keys differs from the spacing between another pair of keys, conduit hub adapter 704 will be insertable through opening 706 in only a single orientation. For example, conduit hub adapter 704 may have two keys, and a first distance between the two keys (i.e., the distance from a first edge of a first key to a first edge of a second key) may be different than a second distance between the two keys (i.e., the distance from a second edge of the first key to a second edge of the second key). In such a configuration, the enclosure 702 would preferably have the same number of keyed sections as the number of keys on conduit hub adapter 704, and the keyed sections of enclosure 702 would preferably be spaced apart in the same manner as the keys on conduit hub adapter 704.

While retainers 438 and 608 are shown in the drawings and described above as having a specific configuration, any type of retainer may be used with the enclosures 202, 302, 402, 602, and 702 to secure a conduit hub adapter 500, 604, 704 to the enclosures when the conduit hub adapter is in the engaged position. The term retainer as used herein means any structure of an enclosure that is configured to engage a conduit hub adapter and substantially constrain the conduit hub adapter from moving in at least one direction. The conduit hub adapters 500, 604, and 704 described herein may further be modified in any manner to include suitable structure for engaging the retainer when the conduit hub adapter is in its engaged position. It is also within the scope of the invention for the enclosures 202, 302, 402, 602, and 702 to have no retainer. For example, the enclosure engaging structure 506 of conduit hub adapter 500 may secure the conduit hub adapter 500 to any of the enclosures 202, 302, 402, 602, and 702 when the conduit hub adapter 500 is in its engaged position to substantially prevent movement of the conduit hub adapter 500 in a direction that is aligned with a central axis of the opening in the enclosure, as described above. However, the conduit hub adapter 500 may not engage a retainer on the enclosure to prevent rotation of the conduit hub adapter 500 back to its disengaged position.

Further, while the conduit hub adapters 500, 604, and 704 are shown in the drawings and described as having keys (e.g., keys 522, 524, and 526) that are insertable through an opening in the enclosure adjacent keyed sections (e.g., keyed sections 442, 444, and 446), the conduit hub adapters 500, 604, and 704 may have any type of enclosure engaging structure other than keys, and the enclosure may be structured in any suitable manner to engage the conduit hub adapters. For example, the base 502 of conduit hub adapter 500 may be configured to include one or more slots that each receive a protrusion extending outward from the top wall 414 of enclosure adjacent opening 418. The slots and protrusions may be configured so that upon rotation of the conduit hub adapter to an engaged position, the protrusions engage the conduit hub adapter to substantially constrain the conduit hub adapter from moving in a direction that is aligned with a central axis of opening 418.

6. Punch Set for Electrical Box

Figure 34:
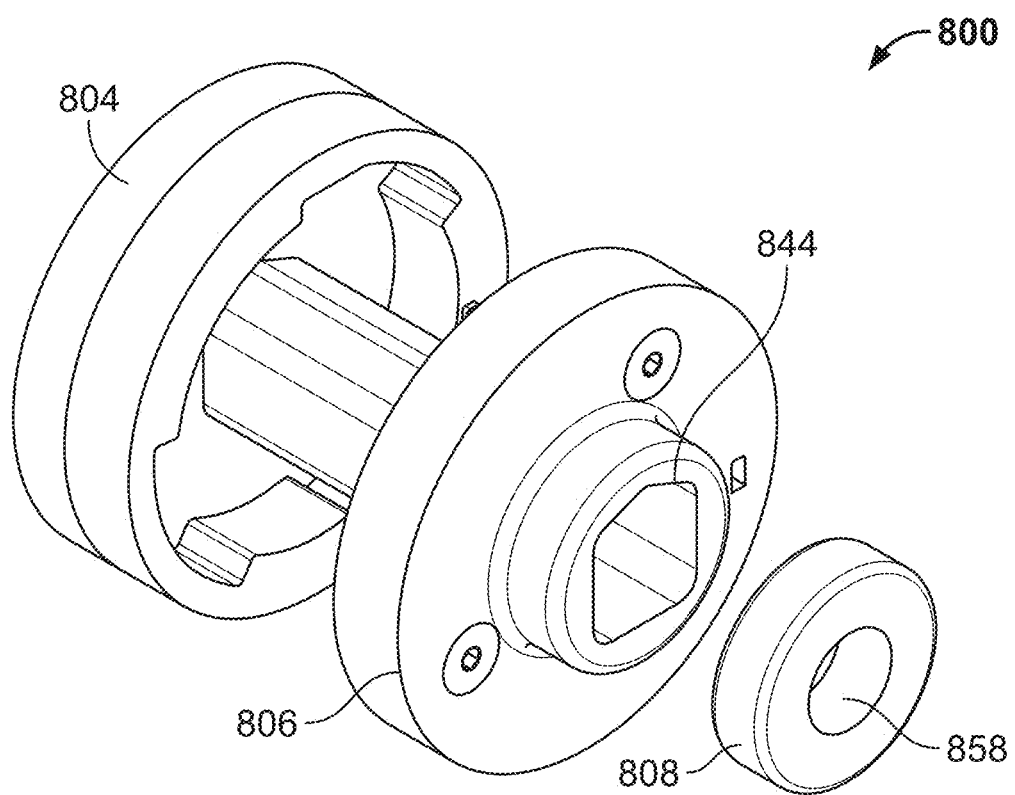
FIG. 34 is a perspective view of a punch set in accordance with another exemplary embodiment of the invention described herein.

Referring to FIG. 34, a punch set in accordance with one exemplary embodiment of the invention described herein is identified generally as 800. Punch set 800 is configured for use with a punch tool (e.g., the punch tool 802 shown in FIGS. 40 and 41) to punch material from a wall of an electrical box. When used with a punch tool, the punch set 800 is designed to form an opening in an electrical box that is shaped and configured like the openings 218 (FIG. 6), 220a-f (FIG. 6), 318 (FIG. 13), 320 (FIG. 13), 418 (FIG. 21), and 420a-f (FIG. 15) described above. The punch set 800 includes a die 804, a punch 806, and a fastener 808.

Figure 36:
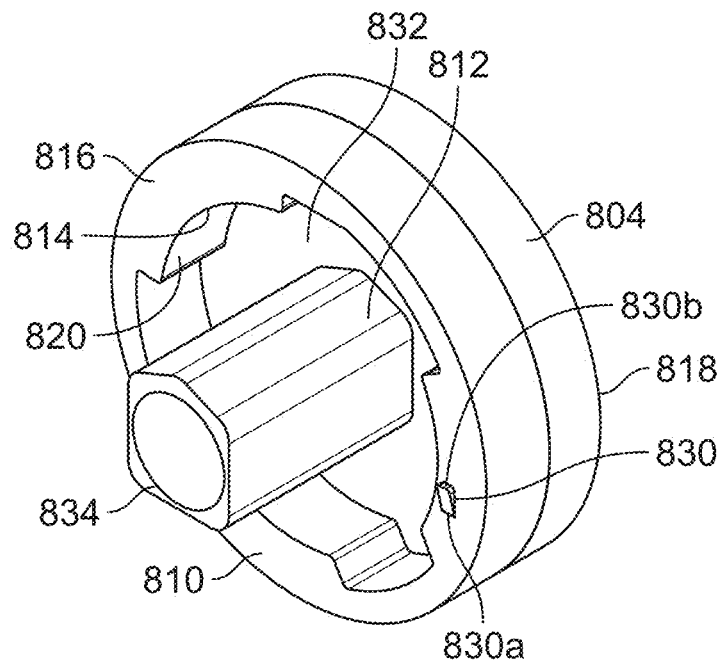
FIG. 36 is a perspective view of a die of the punch set shown in FIG. 34.
Figure 37:
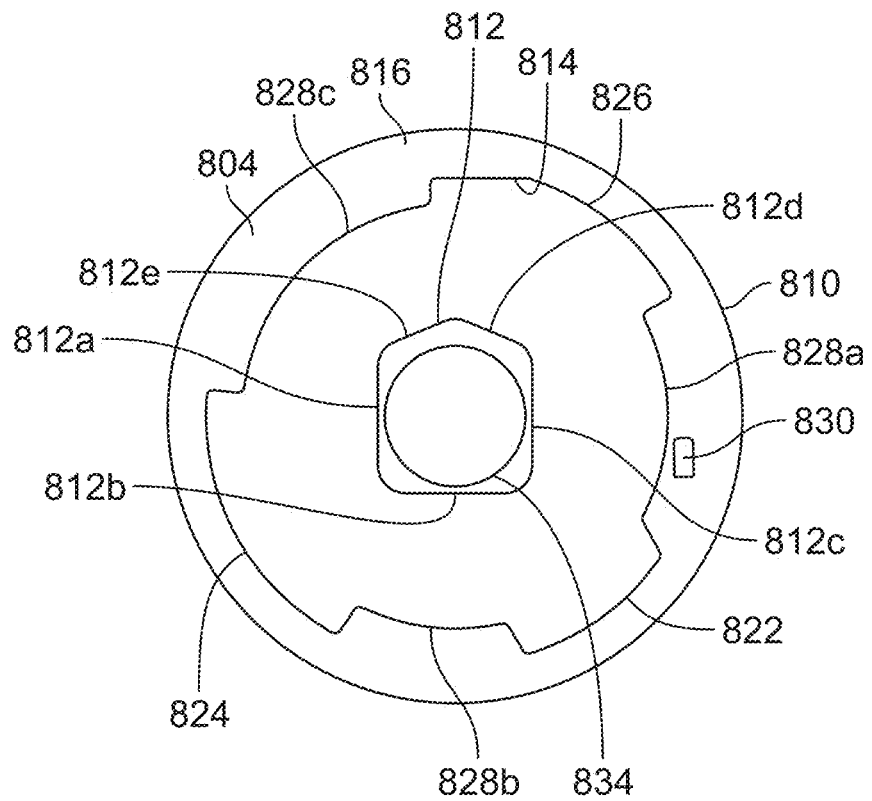
FIG. 37 is a front elevational view of the die shown in FIG. 36.

As shown in FIGS. 36 and 37, the die 804 includes a base 810 and an extension 812 that extends outward from the base 810. The extension 812 may be integrally formed with the base 810 or joined to the base 810 in any other suitable manner. The base 810 is generally cylindrical and includes a cavity 814 that extends from an outer surface 816 of the base 810 inward toward a rear 818 of the base 810. An inner surface 820 is positioned around the cavity 814. The inner surface 820 includes three keyed sections 822, 824, and 826, shown in FIG. 37, that have substantially the same shape and configuration as the keyed sections 442, 444, and 446 of opening 418 described above and shown in FIG. 21. Curved sections 828a-c of the inner surface 820 are each positioned between a pair of adjacent keyed sections 822, 824, and 826 in a similar manner as described above with respect to the curved sections 448a-c of opening 418 described above and shown in FIG. 21.

As shown in FIG. 36, a protrusion 830 extends outward from the outer surface 816 in a direction away from the cavity 814. The protrusion 830 is wedge-shaped and gradually extends outward from the outer surface 816 from a first end 830a to a second end 830b. The protrusion 830 is designed to form the retainer 438 described above and shown in FIGS. 21 and 22 when a punch tool forces the die 804 against the wall of an electrical box. The wedge shape of the protrusion 830 forms the retainer 438 by cutting around three sides of the retainer 438 and forcing the retainer 438 inward into the electrical box 400 as the die 804 is forced against the wall 414.

The extension 812 extends outward from a bottom surface 832 of the cavity 814. The extension 812 has three sides 812a-c that when viewed in cross-section are oriented similar to the three sides of a square and two sides 812d-e that are positioned opposite the side 812b. The side 812d extends from side 812c at an obtuse angle, and the side 812e extends from side 812a at an obtuse angle. The sides 812a-e of the extension 812 are shaped so that they are insertable into a hole of like shape in only a single orientation, as described in more detail below. A hole 834 extends axially through the extension 812 and base 810 for receiving the shaft of a punch tool, as described in more detail below.

Figure 35:
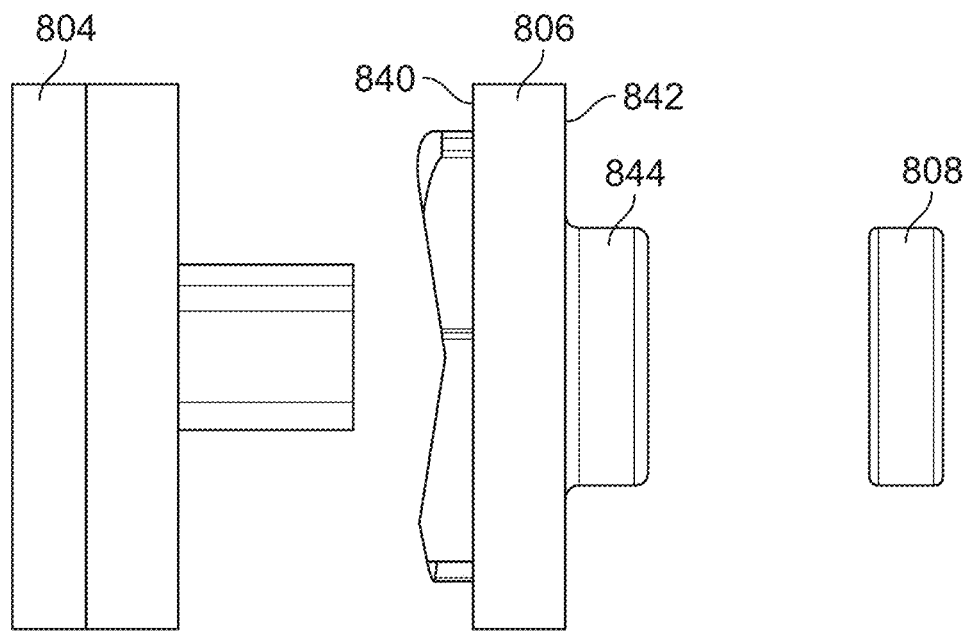
FIG. 35 is a side elevational view of the punch set shown in FIG. 34.
Figure 38:
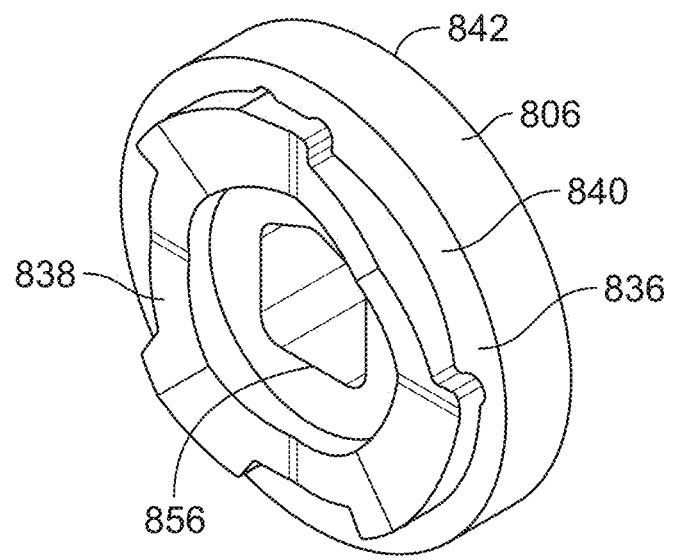
FIG. 38 is a perspective view of a punch of the punch set shown in FIG. 34.
Figure 39:
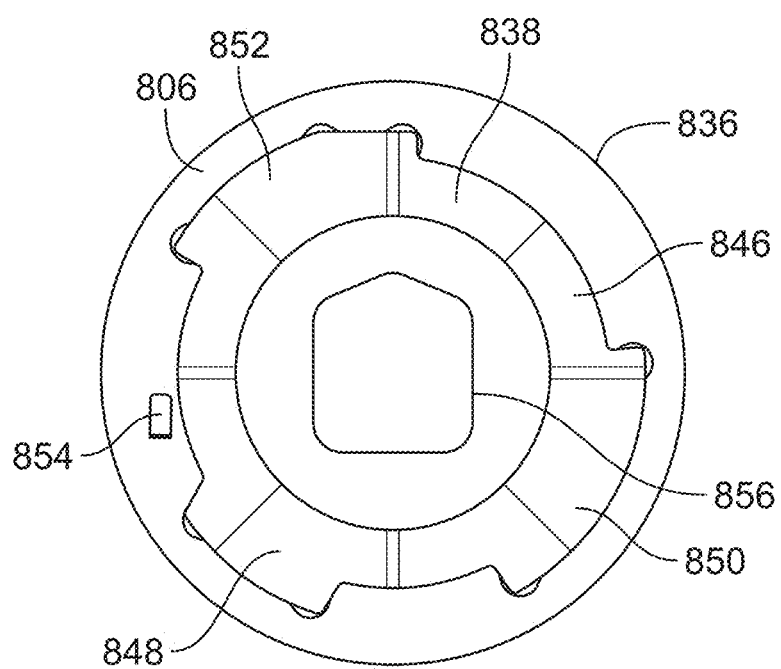
FIG. 39 is a rear elevational view of the punch shown in FIG. 38.

Referring to FIGS. 38 and 39, the punch 806 has a base 836 and a cutting section 838 extending outward from the base 836. The base 836 is generally disc-shaped and has a first end 840 from which the cutting section 838 extends and a second end 842 from which a cylindrical protrusion 844 (FIG. 35) extends. The cutting section 838 may be formed integrally with the base 836 or may be joined to the base 836 in any suitable manner.

As shown in FIG. 39, the cutting section 838 has an annular portion 846 and three keyway forming portions 848, 850, and 852 each extending radially from the annular portion 846. The annular portion 846 is sized to generally correspond with and fit within the curved sections 828a-c of die 804 shown in FIG. 37. The keyway forming portions 848, 850, and 852 are sized to generally correspond with and fit within the keyed sections 822, 824, and 826 of die 804 shown in FIG. 37. In this manner, the cutting section 838 is shaped so that it may be inserted into the cavity 814 of die 804. The cutting section 838 is configured to punch any of the openings 218 (FIG. 6), 220a-f (FIG. 6), 318 (FIG. 13), 320 (FIG. 13), 418 (FIG. 21), and 420a-f (FIG. 15) described above into the wall of an electrical box. Although the cutting section 838 is shown with an annular portion 846, the annular portion 846 may also be circular. In some configurations, the cutting section 838 may have a general shape that is other than annular or circular with the cavity 814 of die 804 having a mating shape.

Due to the configuration of the keyway forming portions 848, 850, and 852 and the keyed sections 822, 824, and 826, the cutting section 838 of the punch 806 is insertable into the cavity 814 of the die 804 in a single orientation. The keyway forming portions 848, 850, and 852 have different shapes that are substantially the same as the shapes of the first, second, and third keys 522, 524, and 526, respectively, described above and shown in FIG. 24. The differences between the shapes of the keyway forming portions 848, 850, and 852, and the respective shapes of the keyed sections 822, 824, and 826, ensure that the keyway forming portions 848, 850, and 852 may only be inserted into the cavity 814 of the die 804 in a single orientation.

The keyway forming portions 848, 850, and 852, and the corresponding keyed sections 822, 824, and 826, may also be spaced apart from each other in a non-uniform manner to ensure that the cutting section 838 of the punch 806 is insertable into the cavity 814 of the die 804 in a single orientation. In this manner, the keyway forming portions 848, 850, and 852 may have substantially the same shape as the keys 714, 716, and 718 described above and shown in FIG. 33, and the keyed sections 822, 824, and 826 may have substantially the same shape as the keyed sections 708, 710, and 712 described above and shown in FIG. 32. With this configuration, the punch set 800 may form the opening 706 shown in FIG. 32. The cutting section 838 of the punch 806 and the cavity 814 of the die 804 may also have any number of keyway forming portions and respective keyed sections in a similar manner as described above with respect to conduit hub adapter 704.

As shown in FIG. 39, the punch 806 has a recess 854 that is configured to receive the protrusion 830 (FIG. 37) of the die 804 when the cutting section 838 of the punch 806 is received within the cavity 814 of the die 804. Further, an opening 856 extends axially through the base 836 and cylindrical protrusion 844 (FIG. 35) of the punch 806. The opening 856 has a substantially similar shape as the extension 812 of the die 804 and is sized to receive the extension 812. Due to the five-sided configuration of the extension 812 and corresponding opening 856, the extension 812 is insertable into the opening 856 from the first end 840 of the base 836 of the punch 806 in a single orientation. The extension 812 and opening 856 are oriented on the die 804 and punch 806, respectively, so that when the extension 812 is inserted into the opening 856, the cutting section 838 of the punch 806 is aligned with and insertable into the cavity 814 of the die 804 and the protrusion 830 of the die 804 is aligned with and insertable into the recess 854 of the punch 806. When the extension 812 is inserted into the opening 856 and a shaft of a punch tool is inserted through the hole 834 of the extension 812, the shaft of the punch tool also extends through the opening 856. The extension 812 and opening 856 may have different shapes than the five-sided shape shown in FIGS. 37 and 39, such different shapes only allowing the extension 812 to be inserted into the opening 856 in a single orientation or, alternatively, allowing insertion in multiple orientations. In another alternative configuration, the extension 812 may be part of the punch 806 extending outward from the base 836 and cutting section 838, and the opening 856 may be part of the die 804. In this configuration, the extension of the punch 806 would be insertable into the opening of the die 804.

As shown in FIG. 34, the fastener 808 is generally disc-shaped and has an opening 858 extending axially through it. The surface surrounding the opening 858 is threaded in a manner that allows it to engage the threaded shaft of a punch tool. The fastener 808 is generally shaped to engage the protrusion 844 of the punch 806 when the threaded shaft of a punch tool is inserted through the die 804 and punch 806, and the fastener 808 is threaded into engagement with the punch tool shaft.

Figure 40:
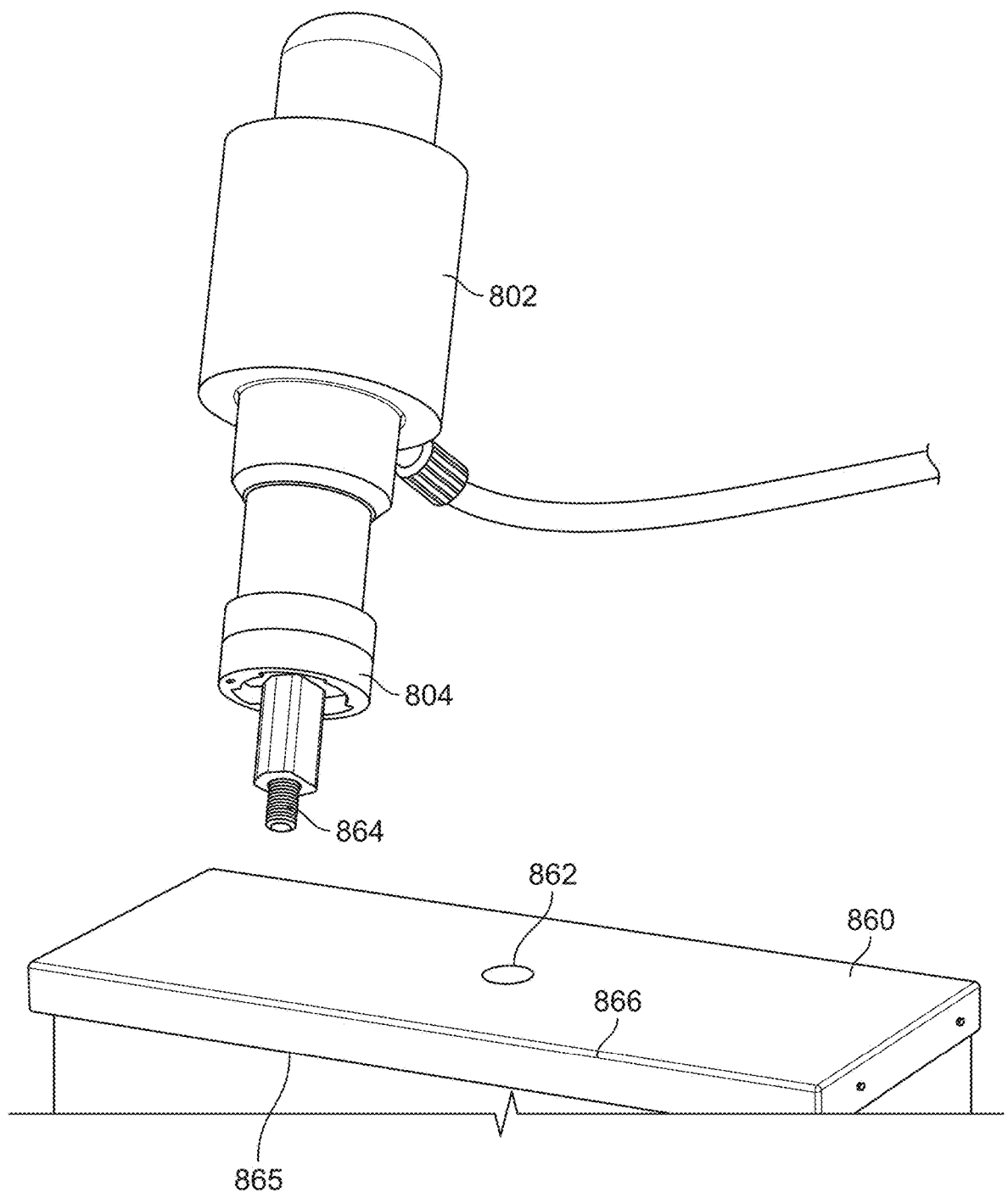
FIG. 40 is a perspective view showing the die of the punch set shown in FIG. 34 installed on a punch tool.

The process for using the punch set 800 with a punch tool 802 is described with reference to FIGS. 40 and 41. The punch tool 802 shown is a conventional hydraulic punch tool for punching holes or openings in electrical boxes. The punch set 800 may be configured for use with other types of punch tools, however, such as ratcheting punch tools, electric or battery operated punch tools, and manual punch tools.

The punch set 800 is used with punch tool 802 for punching an opening in an electrical box 860. First, a preliminary hole 862 is punched or drilled through a wall of the electrical box 860, as shown in FIG. 40. The preliminary hole 862 has a diameter that is less than the diameter of the cutting section 838 of the punch 806, but greater than the diameter of a shaft 864 of the punch tool 802 and the extension 812 of the die 804. The shaft 864 of the punch tool 802 may then be inserted through the hole 834 (FIG. 36) of the die 804 so that the cavity 814 of the die 804 faces the free end of the shaft 864, as shown in FIG. 40. The shaft 864 of the punch tool 802 and the extension 812 of the die 804 are then inserted through the preliminary hole 862 formed in the electrical box 860.

Figure 41:
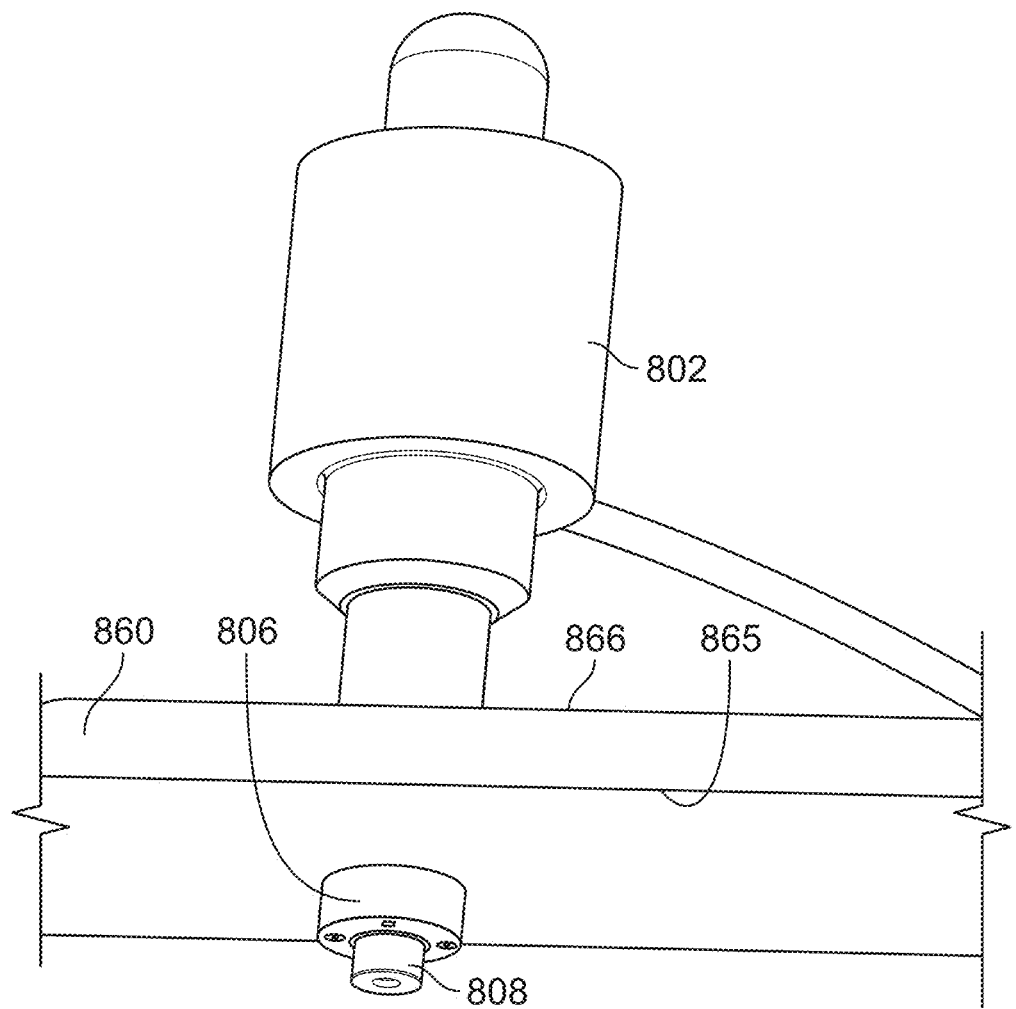
FIG. 41 is a perspective view showing the punch set shown in FIG. 34 installed on a punch tool for punching material from the wall of an electrical box.

As shown in FIG. 41, the punch 806 is positioned inside the electrical box 860, and the punch 806 is moved over the extension 812 of the die 804 so that the opening 856 of the punch 806 receives the extension 812. Alternatively, the extension 812 of the die 804 may be inserted through the preliminary hole 862 of the electrical box 860, and the extension 812 may be placed through the opening 856 of the punch 806 prior to inserting the shaft 864 of the punch tool 802 through the hole 834 of the die 804. The die 804 may be oriented with respect to the electrical box 860 so that the side 812b of the extension 812 is nearest a main opening 865 of the electrical box 860 and parallel to an edge 866 of the electrical box 860. The fastener 808 is then threaded into engagement with the shaft 864 of the punch tool 802 on the inside of the electrical box 860, as shown in FIG. 41.

With the die 804 and punch 806 installed on the punch tool 802 and positioned on opposite sides of the wall of the electrical box 860, the punch tool 802 is then operated to force the die 804 and punch 806 closer to each other until the punch 806 cuts or punches a hole or opening through the electrical box 860 like the opening 418 shown in FIG. 21. As the opening is punched in the electrical box 860, the die 804 forms a retainer in the electrical box 860 like the retainer 438 shown in FIGS. 18 and 20. A lever of the punch tool 802 may be pressed to operate the punch tool 802 and cut a hole through the electrical box 860. Once the hole is cut through the electrical box 860, the punch tool 802 is then operated to move the die 804 and punch 806 away from each other until the operator can remove the fastener 808 from the shaft 864 of the punch tool 802. The punch 806 and die 804 may then be removed from the punch tool 802.

The punch set 800 thus allows an electrician to create an opening in a desired location on an electrical box in the field with the use of conventional punch tools. The opening created may be used to secure any of the conduit hub adapters 500, 604, and 704 described above and shown in FIGS. 23, 29, and 33, respectively, to the electrical box.

Figure 42:
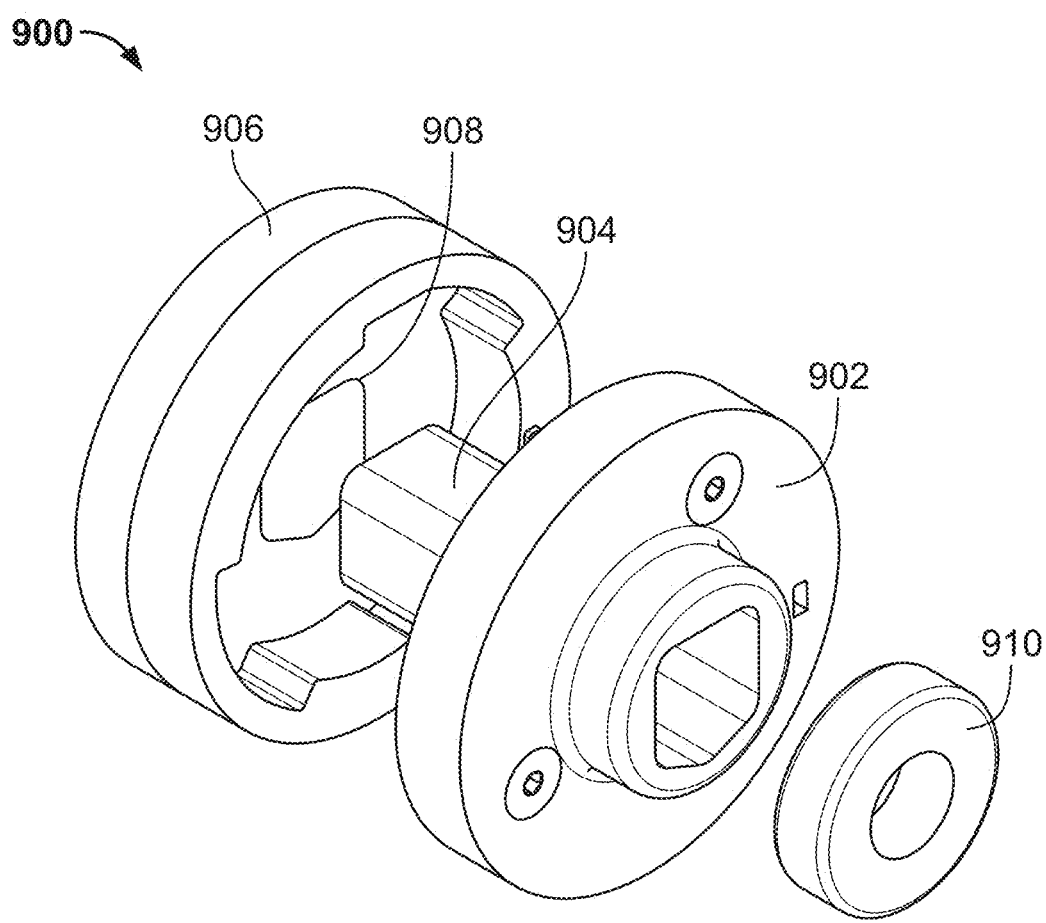
FIG. 42 is a perspective view of an alternative embodiment of punch set in accordance with the invention described herein.

FIG. 42 shows an alternative embodiment of punch set 900, which includes a punch 902 with an extension 904 and a die 906 with an opening 908 that receives the extension 904 in a single orientation. Punch set 900 also has a fastener 910 and is otherwise configured the same as punch set 800 and operates in the same manner as punch set 800 described above.

7. General

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. No language in the description should be construed as indicating any non-claimed element essential to the practice of the invention.

The use of relative relational terms, such as first and second, top and bottom, and left and right, are used solely to distinguish one unit or action from another unit or action without necessarily requiring or implying any actual such relationship or order between such units or actions.

In addition, the recitation of ranges of values in this disclosure is merely intended to serve as a shorthand method of referring individually to each separate value falling within the range. Unless otherwise indicated, each individual value is incorporated into the disclosure as if it were individually recited herein.

The use of the terms "comprises," "comprising," or any other variation thereof, are intended to cover a non-exclusive inclusion, such that a system or method that comprises a list of elements does not include only those elements, but may include other elements not expressly listed or inherent to such system or method.

While the present invention has been described and illustrated hereinabove with reference to several exemplary embodiments, it should be understood that various modifications could be made to these embodiments without departing from the scope of the invention. Therefore, the present invention is not to be limited to the specific configurations or methodologies of the exemplary embodiments, except insofar as such limitations are included in the following claims.

What is claimed and desired to be secured by Letters Patent is as follows:

1. A punch set for use with a punch tool to punch material from a wall of an electrical box, the punch set comprising:
   a punch comprising a cutting section with an annular or circular portion and a plurality of keyway forming portions each extending radially from the annular or circular portion; and
   a die defining a cavity that is configured to receive the cutting section of the punch, wherein the cutting section of the punch is insertable into the cavity of the die in a single orientation,
   wherein either (i) the die comprises a base defining the cavity and an extension extending outward from the base, and the punch comprises a base and defines an opening that extends through the base and is configured to receive the extension in a single orientation, or (ii) the punch comprises an extension extending outward from the cutting section and the die defines an opening that is configured to receive the extension in a single orientation, and
   wherein a hole extending through the extension is configured to receive a shaft of a punch tool.

2. The punch set of claim 1, wherein the plurality of keyway forming portions comprises a first keyway forming portion and a second keyway forming portion, wherein the first keyway forming portion has a different shape than the second keyway forming portion.

3. The punch set of claim 2, wherein the die comprises an outer surface extending at least partially around the cavity and a protrusion extending outward from the outer surface, wherein the punch comprises a recess configured to receive the protrusion when the cutting section of the punch is received within the cavity of the die.

4. The punch set of claim 3, wherein the cutting section is coupled with and extends outward from the base of the punch.

5. The punch set of claim 3, wherein the punch defines a first opening configured to receive a shaft of a punch tool, and the die defines a second opening configured to receive the shaft of the punch tool.

6. The punch set of claim 5, further comprising a fastener that is configured to threadably engage the shaft of the punch tool and engage the punch or the die when the shaft of the punch tool is inserted through the first opening of the punch and the second opening of the die.

7. The punch set of claim 1, wherein the plurality of keyway forming portions are spaced apart from each other in a non-uniform manner such that a first distance between adjacent keyway forming portions is different than a second distance between adjacent keyway forming portions.

8. The punch set of claim 1, wherein the die comprises an outer surface extending at least partially around the cavity and a protrusion extending outward from the outer surface, wherein the punch comprises a recess configured to receive the protrusion when the cutting section of the punch is received within the cavity of the die.

9. The punch set of claim 1, wherein the cutting section is coupled with and extends outward from the base of the punch.

10. The punch set of claim 1, wherein the punch defines a first opening configured to receive a shaft of a punch tool, and the die defines a second opening configured to receive the shaft of the punch tool.

11. The punch set of claim 10, further comprising a fastener that is configured to threadably engage the shaft of the punch tool and engage the punch or the die when the shaft of the punch tool is inserted through the first opening of the punch and the second opening of the die.

12. A punch set for use with a punch tool to punch material from a wall of an electrical box, the punch set comprising:
    a punch comprising a cutting section with an annular or circular portion and a plurality of keyway forming portions each extending radially from the annular or circular portion, wherein the punch defines a first opening configured to receive a shaft of a punch tool; and
    a die defining a cavity that is configured to receive the cutting section of the punch, wherein the cutting section of the punch is insertable into the cavity of the die in a single orientation, wherein the die defines a second opening configured to receive the shaft of the punch tool, and wherein the die comprises an outer surface extending at least partially around the cavity and a protrusion extending outward from the outer surface, wherein the punch comprises a recess configured to receive the protrusion when the cutting section of the punch is received within the cavity of the die, wherein the cavity extends from the outer surface to a bottom surface of the cavity.

13. The punch set of claim 12, wherein the plurality of keyway forming portions comprises a first keyway forming portion and a second keyway forming portion, wherein the first keyway forming portion has a different shape than the second keyway forming portion.

14. The punch set of claim 12, wherein the plurality of keyway forming portions are spaced apart from each other in a non-uniform manner such that a first distance between adjacent keyway forming portions is different than a second distance between adjacent keyway forming portions.

15. The punch set of claim 12, wherein the punch comprises a base, and the cutting section is coupled with and extends outward from the base.

16. The punch set of claim 12, further comprising a fastener that is configured to threadably engage the shaft of the punch tool and engage the punch or the die when the shaft of the punch tool is inserted through the first opening of the punch and the second opening of the die.

* * * * *